United States Patent
Gupta et al.

(10) Patent No.: US 12,548,938 B2
(45) Date of Patent: Feb. 10, 2026

(54) FLIPTOP MODULE AND INSERT FOR HOLDING MULTIPLE TYPES OF CONNECTORS AND CABLES

(71) Applicant: Crestron Electronics, Inc., Rockleigh, NJ (US)

(72) Inventors: Pooja Gupta, Gorakhpur (IN); Edward Joy, Carmel, NY (US)

(73) Assignee: Crestron Electronics, Inc., Rockleigh, NJ (US)

( * ) Notice: Subject to any disclaimer, the term of this patent is extended or adjusted under 35 U.S.C. 154(b) by 350 days.

(21) Appl. No.: 18/522,303

(22) Filed: Nov. 29, 2023

(65) Prior Publication Data

US 2025/0174919 A1    May 29, 2025

(51) Int. Cl.
| | | |
|---|---|---|
| *H01R 13/518* | (2006.01) | |
| *H01R 9/03* | (2006.01) | |
| *H01R 13/44* | (2006.01) | |
| *H01R 13/514* | (2006.01) | |
| *H01R 13/516* | (2006.01) | |

(52) U.S. Cl.
CPC ............. *H01R 13/518* (2013.01); *H01R 9/03* (2013.01); *H01R 13/44* (2013.01); *H01R 13/514* (2013.01); *H01R 13/516* (2013.01)

(58) Field of Classification Search
CPC ........ H01R 13/518; H01R 9/03; H01R 13/44; H01R 13/514; H01R 13/516; H01R 13/72; B65H 75/362; B65H 2701/34; H02G 11/003; H02G 11/02; H02G 3/185; H02G 3/32
See application file for complete search history.

(56) References Cited

U.S. PATENT DOCUMENTS

| | | | |
|---|---|---|---|
| 3,334,770 | A | 8/1967 | Stanback |
| 3,724,889 | A | 4/1973 | Dooley |
| 4,979,634 | A | 12/1990 | Begley |
| 6,046,405 | A | 4/2000 | Obermann et al. |
| 6,162,071 | A | 12/2000 | Muller |
| D465,201 | S | 11/2002 | Gershfeld |

(Continued)

OTHER PUBLICATIONS

AMX by Harman, "Hydraport Architectural Connectivity System", www.amx.com/hydraport.

(Continued)

*Primary Examiner* — Abdullah A Riyami
*Assistant Examiner* — Nader J Alhawamdeh
(74) *Attorney, Agent, or Firm* — Crestron Electronics, Inc.

(57) ABSTRACT

A holder insert is insertable within a module of a fliptop unit for supporting a variety of connectors that may be stored in the module. A platform part has a first surface, an opposing second surface, and an aperture. A pair of arms located at opposite ends of the platform part each extend away from the platform part and have an end section that is mountable at a height within the module. A sleeve extends from the platform part and surrounds the aperture, extending its depth. At least one gap extends from an edge of the platform part to the aperture, and from the first surface to the second surface and at least part way along the sleeve. The holder insert is a single piece of elastic material. A load being placed on the holder insert deforms the holder insert and changes a width of the at least one gap.

18 Claims, 16 Drawing Sheets

(56) References Cited

U.S. PATENT DOCUMENTS

| | | | |
|---|---|---|---|
| 6,739,889 B1* | 5/2004 | Daggett | H01R 13/62938 439/372 |
| 6,802,577 B2 | 10/2004 | Gershfeld | |
| D513,493 S | 1/2006 | Feldstein et al. | |
| 7,312,393 B2 | 12/2007 | McCarthy et al. | |
| D569,863 S | 5/2008 | Feldstein et al. | |
| 7,667,145 B2 | 2/2010 | Dinh et al. | |
| D626,542 S | 11/2010 | Libman et al. | |
| D628,097 S | 11/2010 | Libman et al. | |
| D628,098 S | 11/2010 | Libman et al. | |
| D628,099 S | 11/2010 | Libman et al. | |
| D638,314 S | 5/2011 | Libman et al. | |
| D638,315 S | 5/2011 | Libman et al. | |
| D639,680 S | 6/2011 | Libman et al. | |
| D639,681 S | 6/2011 | Rodriguez et al. | |
| D640,577 S | 6/2011 | Libman et al. | |
| D640,939 S | 7/2011 | Libman et al. | |
| D640,940 S | 7/2011 | Libman et al. | |
| 7,989,710 B2 | 8/2011 | Hansen et al. | |
| D657,315 S | 4/2012 | Feldstein et al. | |
| D664,050 S | 7/2012 | Rodriguez et al. | |
| D678,786 S | 3/2013 | Rodriguez et al. | |
| 8,469,303 B2 | 6/2013 | Feldstein et al. | |
| 8,469,304 B2 | 6/2013 | Feldstein et al. | |
| 8,469,305 B2 | 6/2013 | Feldstein et al. | |
| D686,992 S | 7/2013 | Eisen | |
| 8,896,656 B2 | 11/2014 | Epstein et al. | |
| 8,943,978 B2* | 2/2015 | Soper | A47B 21/06 108/50.02 |
| 9,056,744 B2 | 6/2015 | Feldstein et al. | |
| D734,729 S | 7/2015 | Chaloupecky et al. | |
| 9,257,776 B2* | 2/2016 | Kramer | A47B 21/06 |
| 9,475,673 B2 | 10/2016 | Feldstein et al. | |
| D775,080 S | 12/2016 | Newhouse | |
| 9,706,833 B2 | 7/2017 | Newhouse et al. | |
| D801,285 S | 10/2017 | Timmins et al. | |
| 11,309,658 B2* | 4/2022 | Byrne | H01R 13/5213 |
| 2003/0070592 A1 | 4/2003 | Grasse et al. | |
| 2004/0147147 A1* | 7/2004 | Griepentrog | H01R 13/447 439/131 |
| 2005/0183479 A1 | 8/2005 | Alacqua et al. | |
| 2012/0175452 A1 | 7/2012 | Feldstein et al. | |
| 2013/0068870 A1 | 3/2013 | Feldstein et al. | |
| 2013/0078853 A1* | 3/2013 | Dinh | H02G 3/121 439/535 |
| 2014/0265753 A1 | 9/2014 | Soper et al. | |
| 2014/0273650 A1* | 9/2014 | Reeves | H01R 13/6273 439/660 |
| 2014/0346268 A1 | 11/2014 | Feldstein et al. | |
| 2015/0166299 A1 | 6/2015 | Feldstein et al. | |
| 2019/0161314 A1 | 5/2019 | Replogle et al. | |
| 2019/0166707 A1 | 5/2019 | Pedoeem et al. | |
| 2021/0344181 A1* | 11/2021 | Pedoeem | H02G 3/081 |
| 2023/0278826 A1* | 9/2023 | Replogle | B65H 75/4471 226/45 |
| 2025/0174919 A1* | 5/2025 | Gupta | H01R 13/518 |
| 2025/0174929 A1* | 5/2025 | Gupta | H01R 13/514 |

OTHER PUBLICATIONS

Arthur Holm, "3 Connect, Control & Distribution", Book-AH-23, pp. 1-3, 126-145, (c) 2023, www.arthurholm.com.

Crestron, "FT2 FlipTops™ Cable management systems", pp_Crestron_FT2_FlipTop, (c) 2020, www.crestron.com/Products/Featured-Solutions/Crestron-Fliptops.

Crestron, "FT2 Series FlipTops ™" pb_crestron_ft2_series_fliptops_brochure, (c) 2020, www.crestron.com/Products/Featured-Solutions/Crestron-Fliptops.

Extron, "Cable Cubby Series Cable Access Enclosures", cable_cubby_series_verD, (c) 2019, www.extron.com.

FSR, "At-A-Glance", At_A_Glance_Brochure_LIT1188Y, (c) 2022, fsrinc.com.

FSR, "Global At-A-Glance", LIT1471J_Global_At_A_Glance_Brochure, (c) 2022, fsrinc.com.

FSR, "Table Connectivity", LIT1731E_Office_Interior_Technology_Brochure, pp. 5-19,50, www.fsrconnectivity.com.

FSR, "Table Connectivity", Table_Box_Brochure_LIT1187X, (c) 2022, fsrinc.com.

HermanMiller, "Logic Power Access Solutions ™", logic_power_access_solutions_product_sheet, (c) 2021, hermanmiller.com/logic-power-access-solutions.

Kramer, "Table Boxes", "Kramer Connect", Quick Catalog_Aug_2023, pp. 1,21-33, kramerav.com.

Legrand Catalog, "Wiremold Wire & Cable Managemen", wiremold_catalog22-23, pp. 1,386-399,804-805, (c) 2022, www.legrand.us.

* cited by examiner

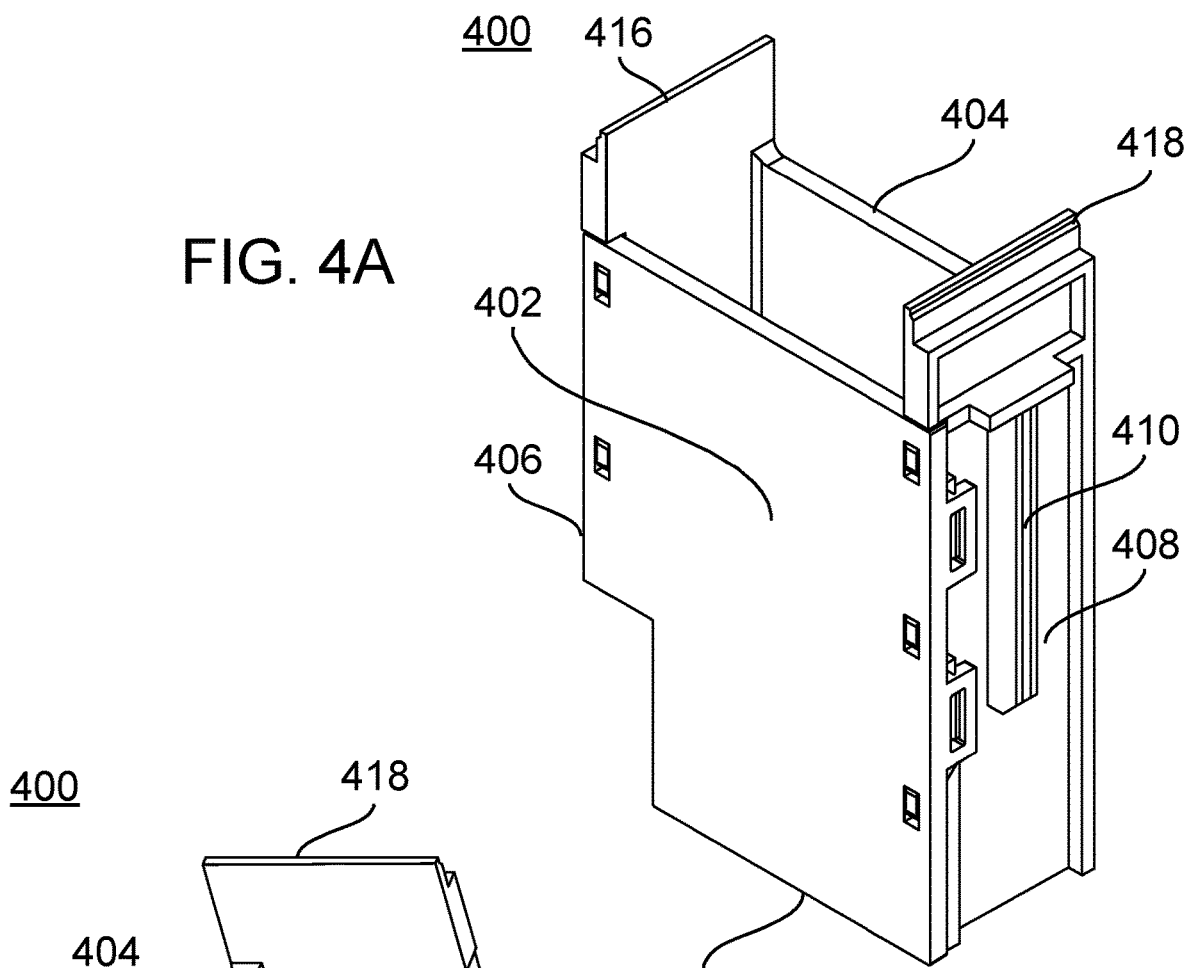

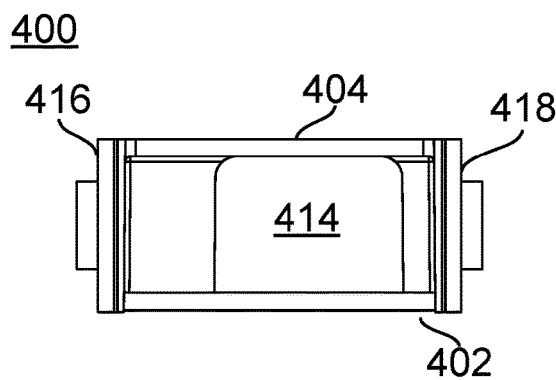
FIG. 4C
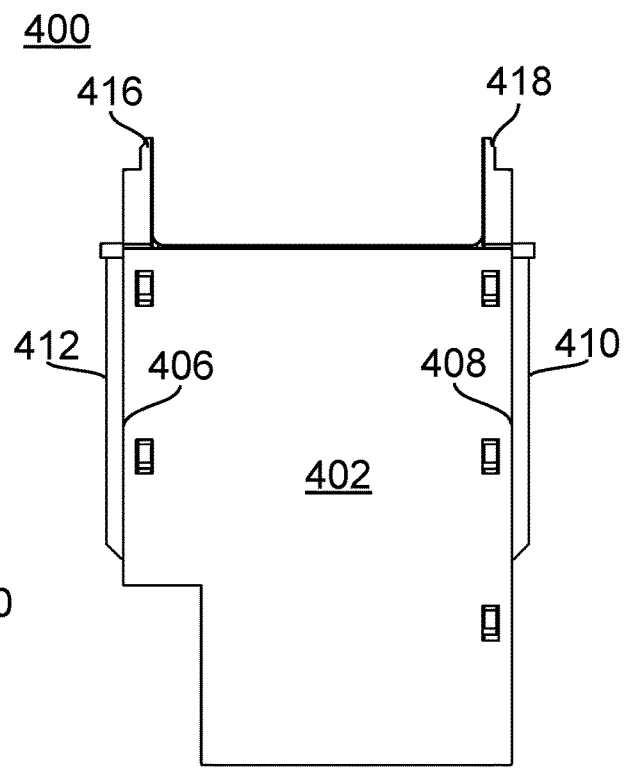
FIG. 4E
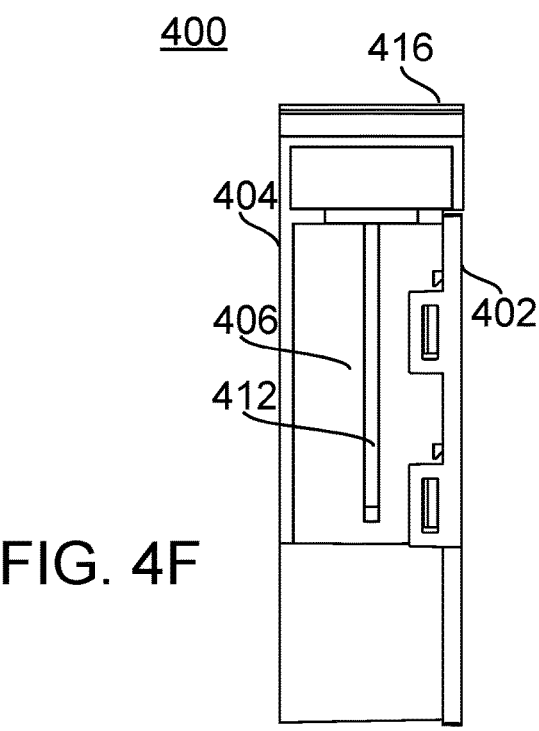
FIG. 4D
FIG. 4F
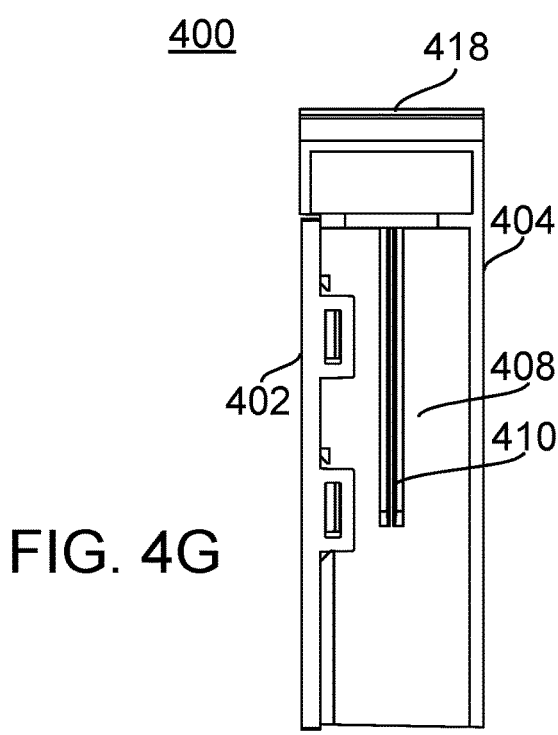
FIG. 4G

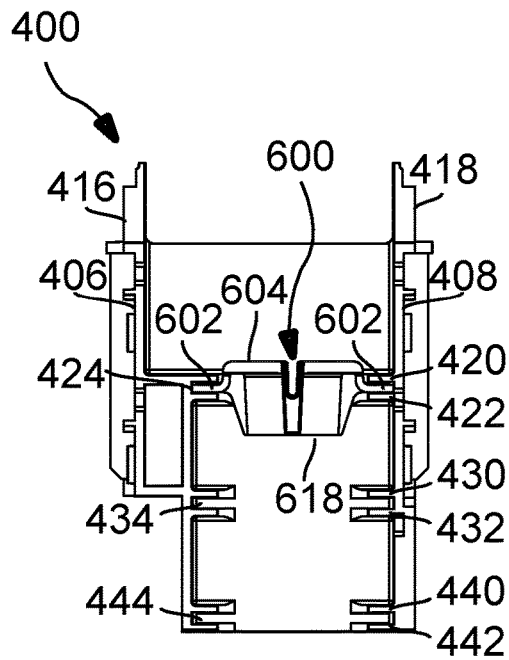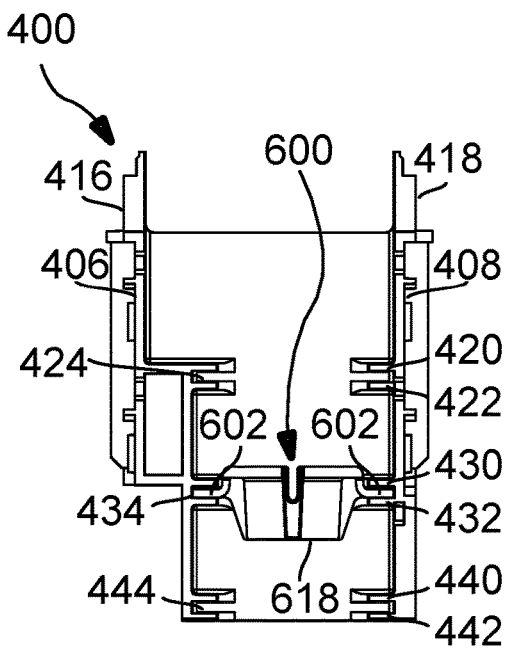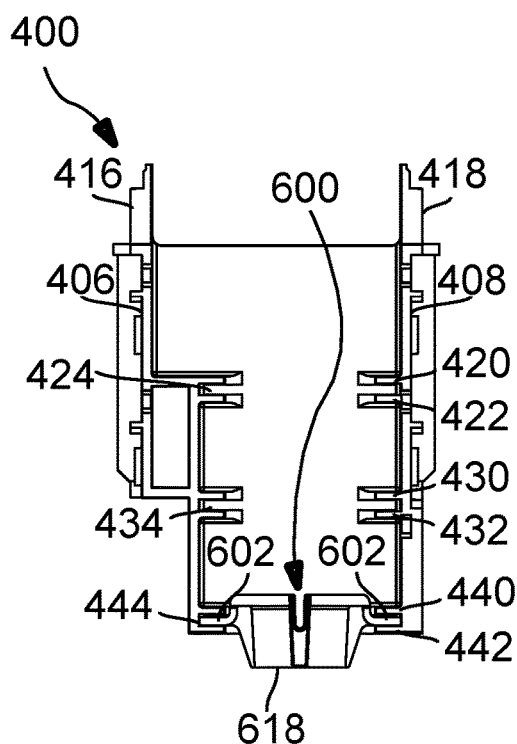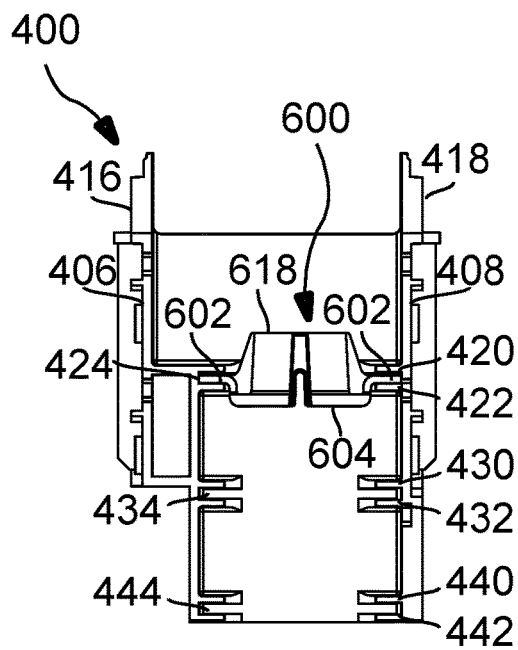

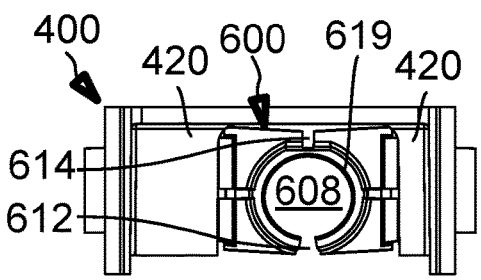
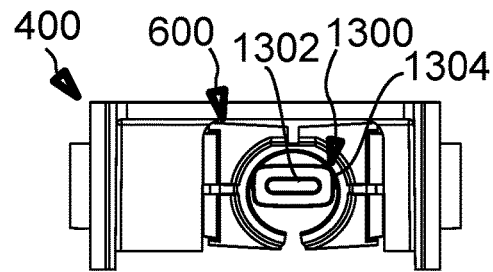
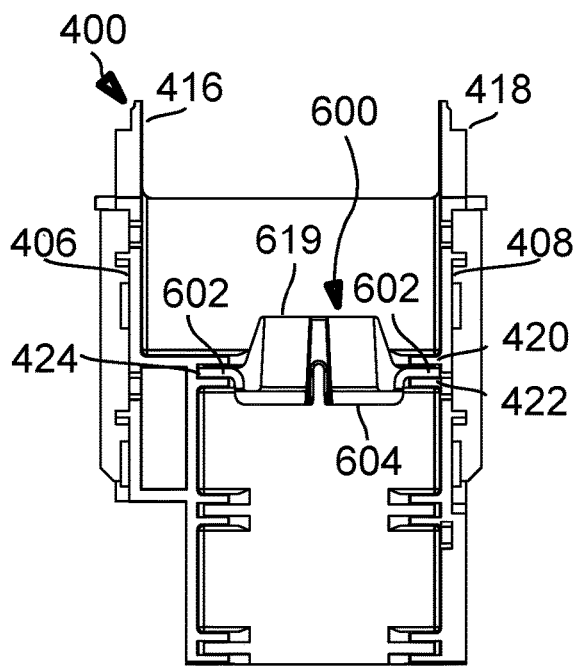
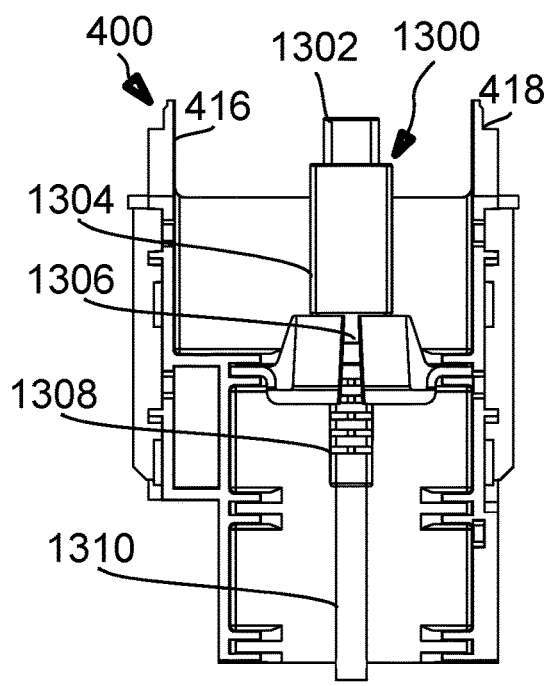
FIG. 13A
FIG. 13C
FIG. 13B
FIG. 13D
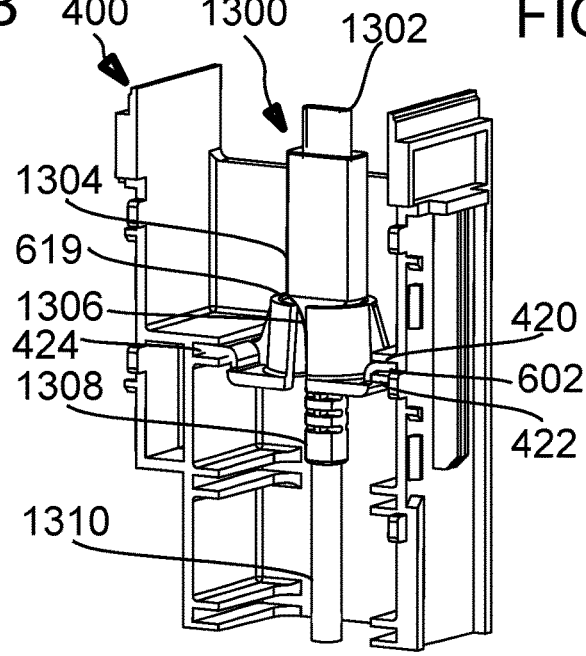
FIG. 13E

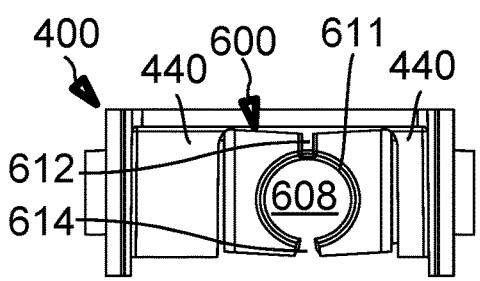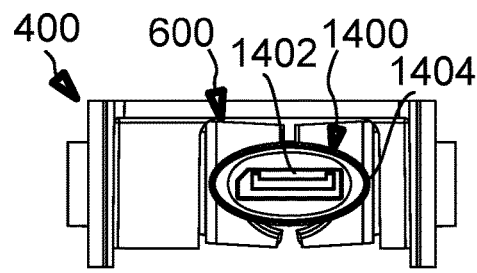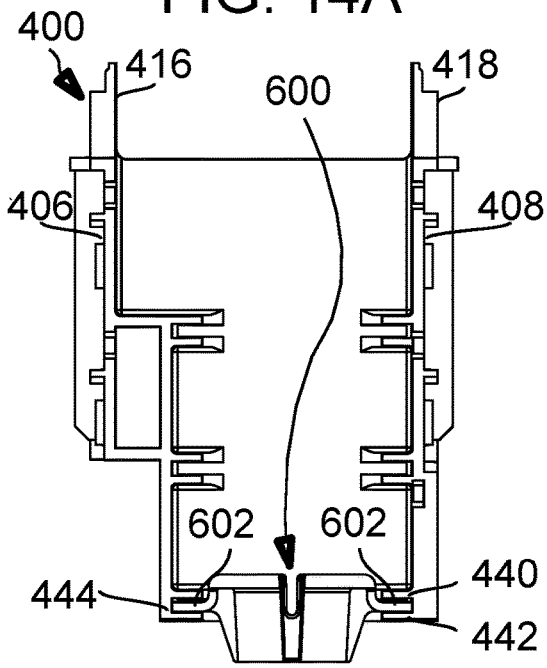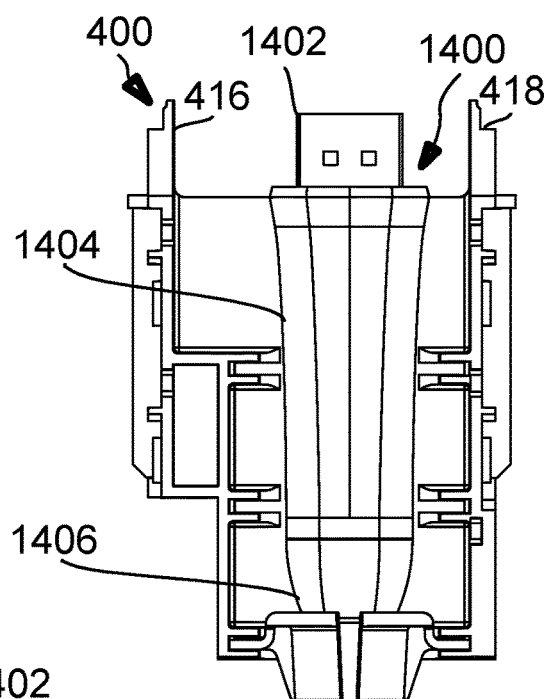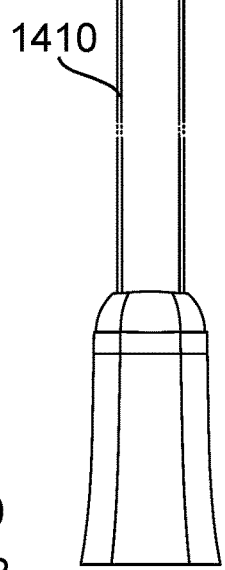
FIG. 14A
FIG. 14C
FIG. 14B
FIG. 14E
FIG. 14D

FLIPTOP MODULE AND INSERT FOR HOLDING MULTIPLE TYPES OF CONNECTORS AND CABLES

BACKGROUND OF THE INVENTION

Technical Field

The present embodiments relate to fliptop units that are insertable into an opening in a tabletop or other surface for providing access to cables, connectors, and power outlets and, more particularly, the present embodiments relate to modules that are insertable into the fliptop unit for storing various types of connectors and cables and to holder inserts for such modules.

Background Art

In many applications, it is desirable to provide power and data connections to different electrical or electronic devices using cables that may be dispensed when needed and then withdrawn when no longer needed. For example, many business and academic environments include conference rooms in which meetings are held where the participants bring laptop or notebook computers, video projectors or other devices that require various data connections. It is desirable that the conference room or other facility be configured to deliver these services by providing cables which are connectable to the various devices. It is further desired that such cables can be stowed away out of sight when they are no longer needed.

Various apparatuses are known which can provide such cable connections. As an example, tabletop enclosures, such as a fliptop unit, may be provided recessed in an opening in the conference tabletop or other work surface and having a housing that extends below the tabletop or surface. One or more connectors, each attached to an end of a corresponding cable, are accessible from within the enclosure. The cable is stored in a device, such as a cable retractor, which permits the connector and cable to be pulled out from the enclosure when needed and then retracted after use.

To customize the tabletop enclosure or fliptop unit for a given application or a particular customer, the tabletop enclosure or fliptop unit is typically comprised of various modules. These modules are insertable into the opening in the fliptop unit and are chosen depending on the power and data connection needs of the application or customer. For example, a fliptop unit may include one or more modules that provide electrical power outlets and may include one or more modules that provide receptacles for various types of data connections. Additionally, the tabletop enclosure or fliptop typically includes one or more pass-through modules that each hold a given data connector head and an end portion of its associated cable, with an intermediate portion of the cable being stored in the cable retractor and another end of the cable being connected to a data line. When needed by a user, the connector head and part or all of the cable may be withdrawn from the module, and the data connector plugged into a data port of a personal computer or other device to provide a data connection. Subsequently, when the data connection is no longer needed, the connector head and the withdrawn portion of the cable may be retracted back into the module and the retractor.

Typically, a different type of module is required for holding each different type of data connector and cable. For example, one type of module is configured specifically for holding an HDMI® connector and cable, whereas another type of module is configured specifically for holding a USB-A connector and cable, and a further type of module is configured specifically for a USB-C® connector and cable. Additional types of modules are required for other types of connectors and cables, respectively. Different modules are required for each type of connector and cable because the height, width and shape of the connector head differs for each type of connector, thereby requiring a different shape and location of the sleeve used to hold that type of connector. Additionally, the diameter of the cable, and whether the cable is flat or round, may also differ with each connector type, thereby requiring a different opening in the sleeve for each type of cable. As a result, a different design and tooling is required for the module used to hold each type of cable, which increases the cost of manufacturing the modules.

It is therefore desirable to provide a retractor module that is suitable for holding any one of multiple types of connector heads and cables. It is further desirable to provide a sleeve for a retractor module that may also be used for multiple types of connector heads and cables.

SUMMARY OF THE INVENTION

It is to be understood that both the general and detailed descriptions that follow are exemplary and explanatory only and are not restrictive.

DISCLOSURE OF INVENTION

In accordance with an aspect, a holder insert that is insertable within a module of a fliptop unit for supporting any one of a variety of connectors that may be stored in the module, comprises (a) a platform part having a first surface, an opposing second surface, and an aperture formed therein having a depth that extends at least through the platform part; (b) a pair of arms that are located at opposite ends of the platform part, each one of the pair of arms extending away from the platform part and having an end section that is configured to be mountable at a particular height within the module; and (c) a sleeve that extends from the second surface of the platform part to an end surface thereof and that substantially surrounds the aperture in the platform part and thereby extends the depth of the aperture to the end surface of the sleeve; (d) wherein (1) at least one gap is formed in the holder insert, the at least one gap extending in one direction from an edge of the platform part to the aperture in the platform part, and extending in another direction from the first surface of the platform part to the second surface of the platform part and then through a wall of the sleeve along a depth of the sleeve at least part way to the end surface of the sleeve, and (2) the holder insert is formed of a single piece of elastic material such that upon a load being placed on the holder insert, the holder insert deforms and a width of the at least one gap changes.

According to a further aspect, a holder insert that is insertable within a module of a fliptop unit for supporting any one of a variety of connectors that may be stored in the module, comprises (a) a platform part having a first surface, an opposing second surface, and an aperture formed therein having a depth that extends at least through the platform part; (b) a pair of arms that are located at opposite ends of the platform part, each one of the pair of arms extending away from the platform part and having an end section that is configured to be mountable at a particular height within the module, each one of the pair of arms including (1) a bend section that extends from the second surface of the platform part and bends into a direction away from the sleeve, and (2)

a further section that extends outward from an end of the bend section and that terminates at the end section; and (c) a sleeve that extends from the second surface of the platform part to an end surface thereof and that substantially surrounds the aperture in the platform part and thereby extends the depth of the aperture to the end surface of the sleeve; (d) wherein (1) a first gap is formed in the holder insert, the first gap extending in one direction from the edge of the platform part to the aperture in the platform part, and then extending in another direction from the first surface of the platform part to the second surface of the platform part and then through a wall of the sleeve along an entire depth of the sleeve to the end surface of the sleeve, (2) a second gap is formed in the holder insert, the second gap extending in a direction opposite to the one direction from the edge of the platform part to the aperture in the platform part, and extending in the another direction from the first surface of the platform part to the second surface of the platform part and then through the wall of the sleeve along a part of the depth of the sleeve, terminating part way to the end surface of the sleeve, (3) the holder insert is configured to be mountable within the module in an upright orientation and is further configured to be alternatively mountable within the module in an upturned orientation, such that (A) upon the holder insert being mounted within the module in the upright orientation, the holder insert is arranged to receive a connector head such that a portion of the connector head rests at least upon an intersection of the first surface and the aperture, and (B) upon the holder insert being mounted within the module in the upturned orientation, the holder insert is arranged to receive the connector head such that a portion of the connector head rests at least upon an intersection of the end surface and the aperture, and (4) the holder insert is formed of a single piece of elastic material such that upon the connector head being received on the holder insert, the holder insert deforms and a width of the first and second gap increase, thereby increasing a circumference of the aperture.

According to a still further aspect, a holder insert that is insertable within a module of a fliptop unit for supporting any one of a variety of connectors that may be stored in the module, comprises (a) a platform part having a first surface, an opposing second surface, and an aperture formed therein having a depth that extends at least through the platform part; (b) a pair of arms that are located at opposite ends of the platform part, each one of the pair of arms extending away from the platform part and having an end section that is configured to be mountable at a particular height within the module, each one of the pair of arms including (1) an upright section that extends from the second surface of the platform part and has a length greater than the depth of the sleeve; (2) a bend section that extends from an end of the upright section and bends into a direction away from the sleeve; and (3) a further section that extends from an end of the bend section and that terminates at the end section; and (c) a sleeve that extends from the second surface of the platform part to an end surface thereof and that substantially surrounds the aperture in the platform part and thereby extends the depth of the aperture to the end surface of the sleeve; (d) wherein (1) a first gap is formed in the holder insert, the first gap extending in one direction from the edge of the platform part to the aperture in the platform part, and then extending in another direction from the first surface of the platform part to the second surface of the platform part and then through a wall of the sleeve along an entire depth of the sleeve to the end surface of the sleeve, (2) a second gap is formed in the holder insert, the second gap extending in a direction opposite to the one direction from the edge of the platform part to the aperture in the platform part, and extending in the another direction from the first surface of the platform part to the second surface of the platform part and then through the wall of the sleeve along a part of the depth of the sleeve, terminating part way to the end surface of the sleeve, (3) the holder insert is configured to be mountable within the module in an upright orientation, such that (A) upon the holder insert being mounted within the module in the upright orientation, the holder insert is arranged to receive a connector head such that a portion of the connector head rests at least upon an intersection of the first surface and the aperture, and (4) the holder insert is formed of a single piece of elastic material such that upon the connector head being received on the holder insert, the holder insert deforms and a width of the first and second gap increase, thereby increasing a circumference of the aperture.

According to another aspect, a module that is insertable within a fliptop unit for supporting any one of a variety of connectors that may be stored within the module comprises (a) a front wall, a rear wall, and a pair of opposing sidewalls that enclose an opening through the module, the pair of opposing sidewalls each being disposed between the front wall and the rear wall; (b) wherein (1) an inner wall of one of the pair of opposing sidewalls includes a plurality of mounting locations each configured to receive an end section of one of a pair of arms of a holder insert, the plurality of mounting locations corresponding to a plurality of heights along the opening of the module, (2) an inner wall of another one of the pair of opposing sidewalls includes a plurality of opposing mounting locations each configured to receive an end section of another one of the pair of arms of the holder insert, the plurality of opposing mounting locations further corresponding to the plurality of heights along the opening of the module, and (3) the holder insert is mountable at any one of the plurality of heights along the opening of the module.

According to yet another aspect, a module that is insertable within a fliptop unit comprises (a) a front wall, a rear wall, and a pair of opposing sidewalls that enclose an opening through the module, the pair of opposing sidewalls each being disposed between the front wall and the rear wall; wherein (1) an inner wall of one of the pair of opposing sidewalls includes a plurality of mounting locations corresponding to a plurality of heights along the opening of the module, and (2) an inner wall of another one of the pair of opposing sidewalls includes a plurality of opposing mounting locations further corresponding to the plurality of heights along the opening of the module; and (b) a holder insert configured to support any one of a variety of connectors that may be stored in the module, the holder insert comprising: (1) a platform part having a first surface, an opposing second surface, and an aperture formed therein having a depth that extends at least through the platform part, (2) a pair of arms that are located at opposite ends of the platform part, each one of the pair of arms extending away from the platform part and having an end section that is configured to be mountable at a particular height within the module, and (3) a sleeve that extends from the second surface of the platform part to an end surface thereof and that substantially surrounds the aperture in the platform part and thereby extends the depth of the aperture to the end surface of the sleeve, (4) wherein (A) at least one gap is formed in the holder insert, the at least one gap extending in one direction from an edge of the platform part to the aperture in the platform part, and extending in another direction from the first surface of the platform part to the second surface of the platform part and then through a wall of the sleeve along a depth of the sleeve at least part way to the end surface of the sleeve, and (B) the holder insert is formed of a single piece of elastic material such that upon a load being placed on the holder insert, the holder insert deforms and a width of the at least one gap changes; (c) wherein (1) the plurality of mounting locations are each configured to receive an end section of one of the pair of arms of the holder insert, (2) the plurality of opposing mounting locations are each configured to receive an end section of another one of the pair of arms of the holder insert, and (3) the holder insert is mountable at any one of the plurality of heights along the opening of the module.

According to still another aspect, a module that is insertable within a fliptop unit comprises (a) a front wall, a rear wall, and a pair of opposing sidewalls that enclose an opening through the module, the pair of opposing sidewalls each being disposed between the front wall and the rear wall; wherein (1) an inner wall of one of the pair of opposing sidewalls includes a plurality of mounting locations corresponding to a plurality of heights along the opening of the module, (2) an inner wall of another one of the pair of opposing sidewalls includes a plurality of opposing mounting locations further corresponding to the plurality of heights along the opening of the module, (3) each one of the plurality of mounting locations of the inner wall of the one sidewall and each one of the plurality of opposing mounting locations of the inner wall of the another sidewall includes a respective pair of shelves extending from that inner wall, and (4) a spacing between each respective pair of shelves defines a respective slot; and (b) a holder insert configured to support any one of a variety of connectors that may be stored in the module, the holder insert comprising: (1) a platform part having a first surface, an opposing second surface, and an aperture formed therein having a depth that extends at least through the platform part, (2) a pair of arms that are located at opposite ends of the platform part, each one of the pair of arms extending away from the platform part and having an end section that is configured to be mountable at a particular height within the module, and (3) a sleeve that extends from the second surface of the platform part to an end surface thereof and that substantially surrounds the aperture in the platform part and thereby extends the depth of the aperture to the end surface of the sleeve, (4) wherein (A) at least one gap is formed in the holder insert, the at least one gap extending in one direction from an edge of the platform part to the aperture in the platform part, and extending in another direction from the first surface of the platform part to the second surface of the platform part and then through a wall of the sleeve along a depth of the sleeve at least part way to the end surface of the sleeve, and (B) the holder insert is formed of a single piece of elastic material such that upon a load being placed on the holder insert, the holder insert deforms and a width of the at least one gap changes; (c) wherein (1) the slots of each one of the plurality of mounting locations are each configured to receive an end section of one of the pair of arms of the holder insert, (2) the slots of the plurality of opposing mounting locations are each configured to receive an end section of another one of the pair of arms of the holder insert, (3) the holder insert is mountable at any one of the plurality of heights along the opening of the module, (4) a given one of the plurality of mounting locations and a corresponding one of the plurality of opposing mounting locations are selected for mounting the holder insert based on (A) the height of each mounting location and a height of a particular connector head that is to rest on the holder insert, and (B) such that upon a part of the connector head resting upon the mounted holder insert, a top of the connector head does not extend above the front wall, the rear wall, and the pair of opposing sidewalls of the module, (5) each one of the plurality of mounting locations and each one of the plurality of opposing mounting locations is configured to receive the holder insert arranged in an upright orientation, (6) each one of the plurality of mounting locations and each one of the plurality of opposing mounting locations is further configured to alternatively receive the holder insert arranged in an upturned orientation, and (7) whether the upright orientation or the upturned orientation is chosen for mounting the holder insert is (A) a function of (i) the height of the one of the plurality of mounting locations and the one of the plurality of opposing mounting locations chosen, and (ii) a height of a particular connector head that is to rest on the holder insert, and (B) such that upon a part of the connector head resting upon the holder insert, a top of the connector head does not extend above the front wall, the rear wall, and the pair of opposing sidewalls of the module.

BRIEF DESCRIPTION OF DRAWINGS

The accompanying figures further illustrate the present embodiments.

The components in the drawings are not necessarily drawn to scale, emphasis instead being placed upon clearly illustrating the principles of the present embodiments. In the drawings, like reference numerals designate corresponding parts throughout the several views.

BRIEF DESCRIPTION OF THE SEVERAL VIEWS OF THE DRAWING

Figure 1:
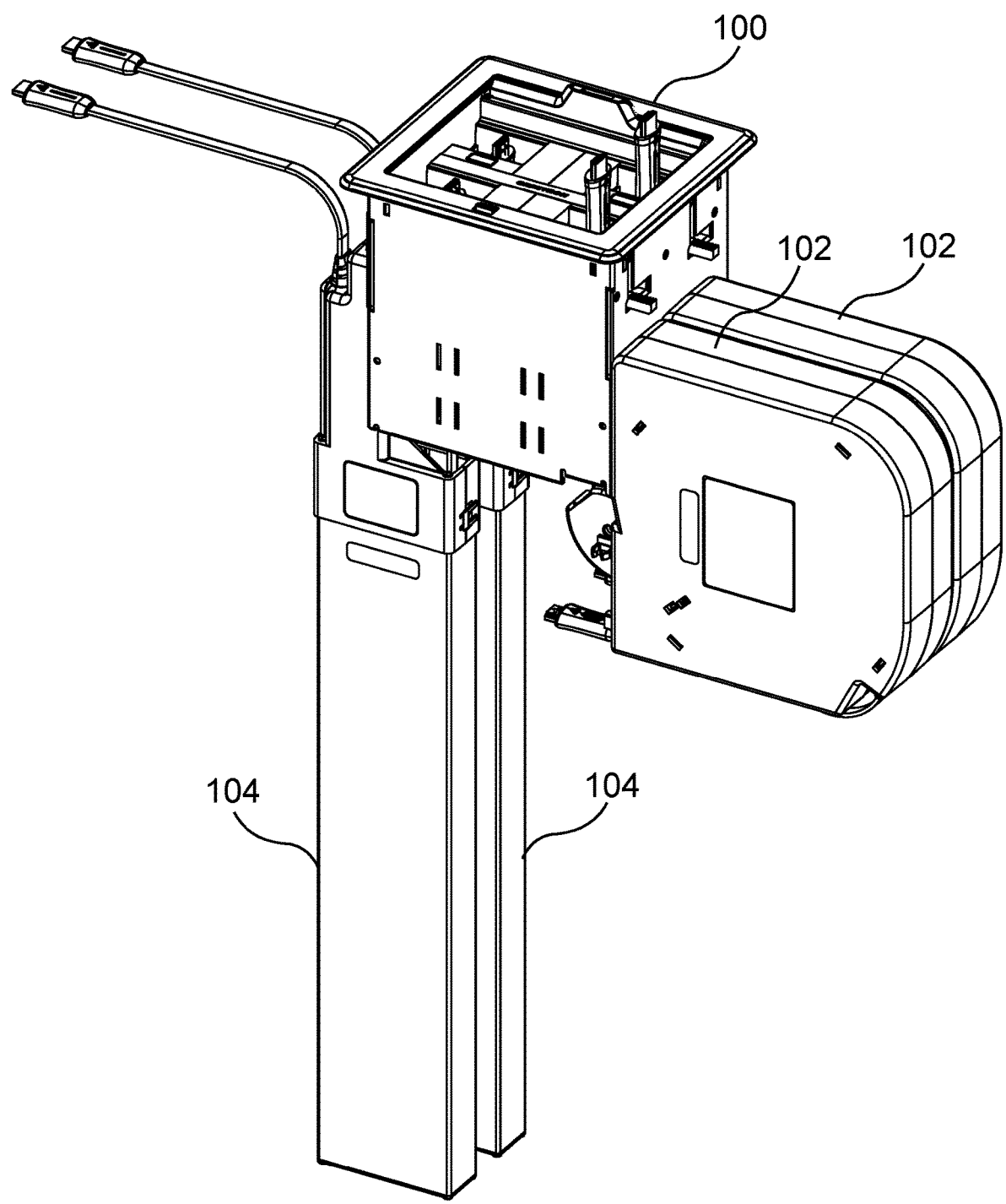

FIG. 1 is an isometric view of a known fliptop unit with various cable retractors attached thereto.

Figure 2A:
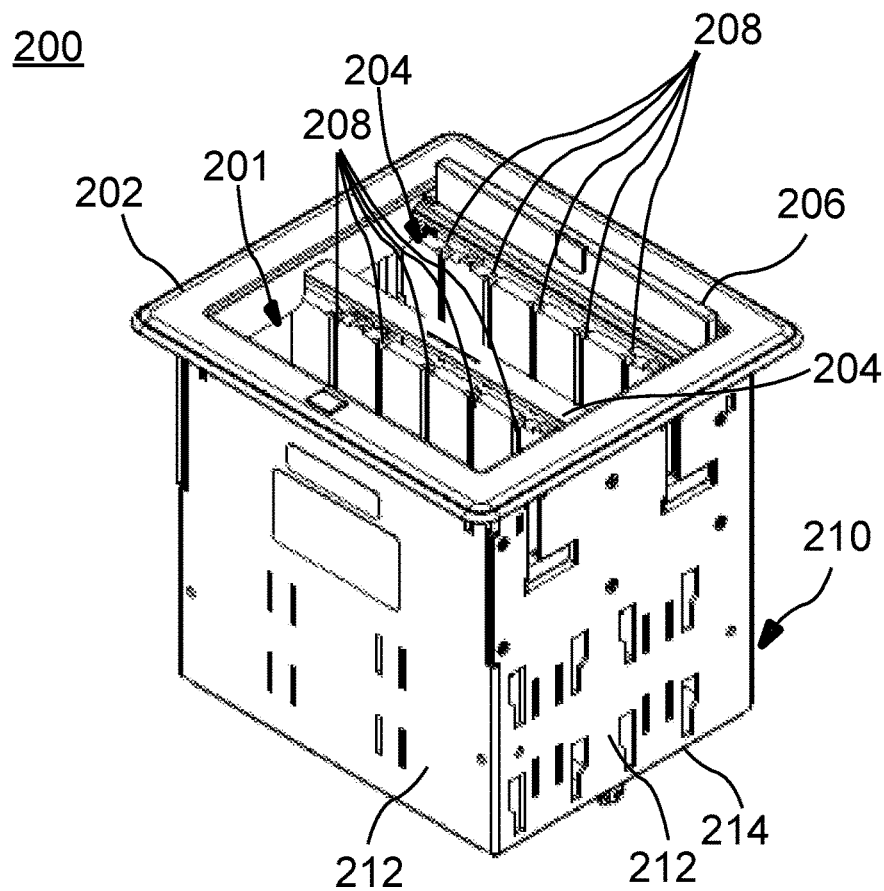
Figure 2B:
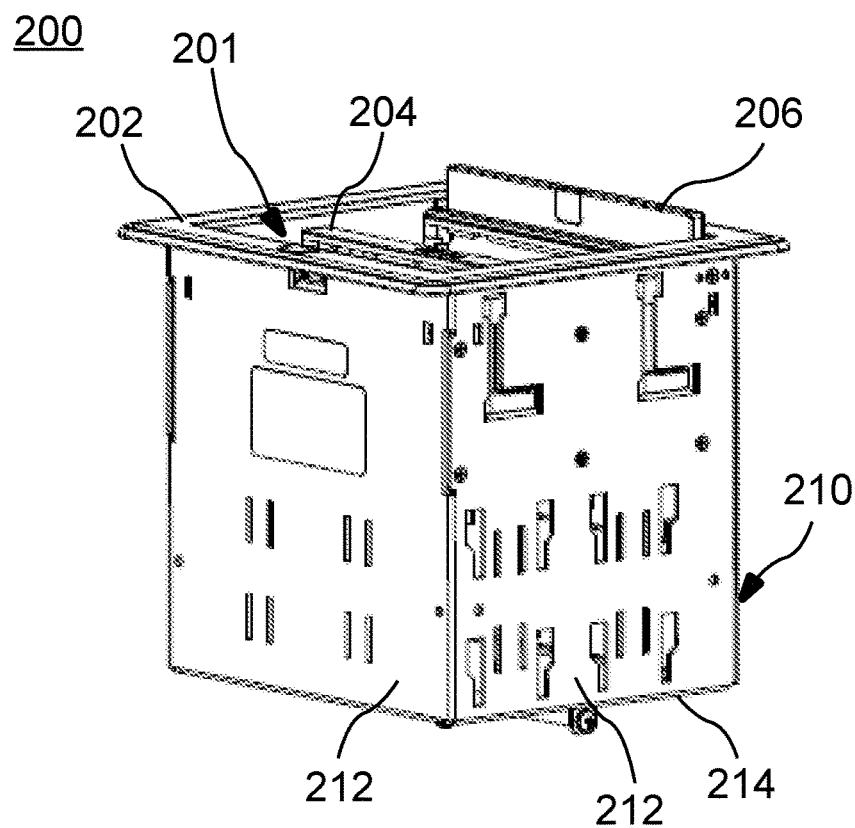

FIGS. 2A and 2B are isometric views of a known fliptop unit without any modules inserted therein.

Figure 3A:
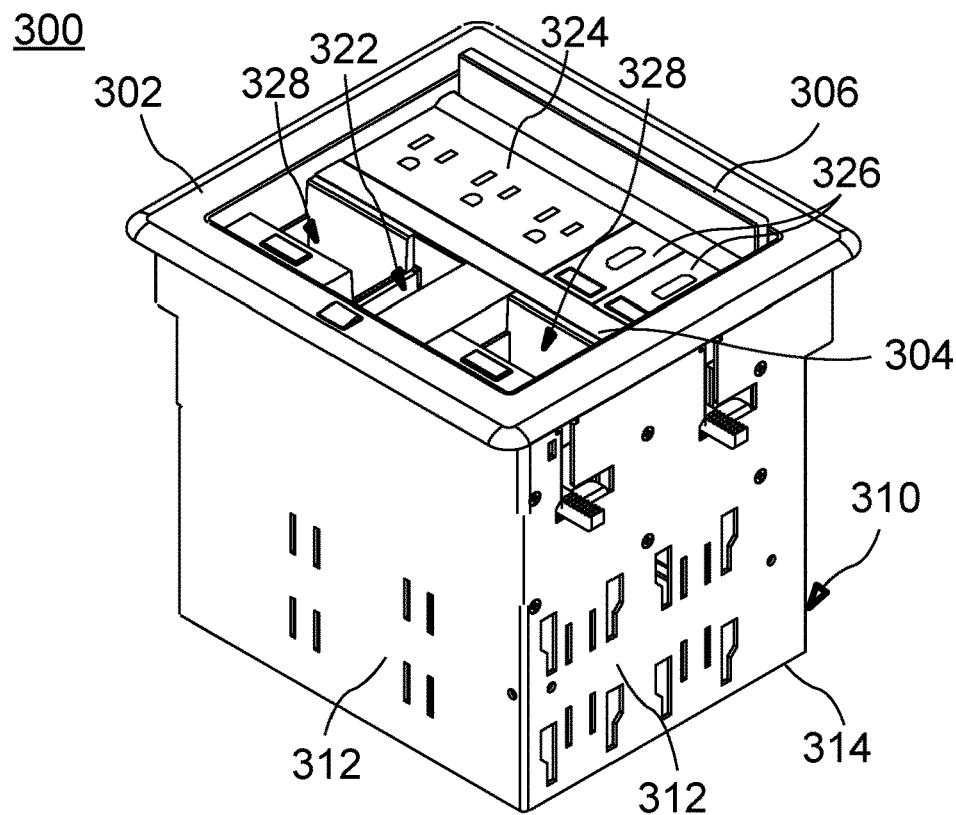
Figure 3B:
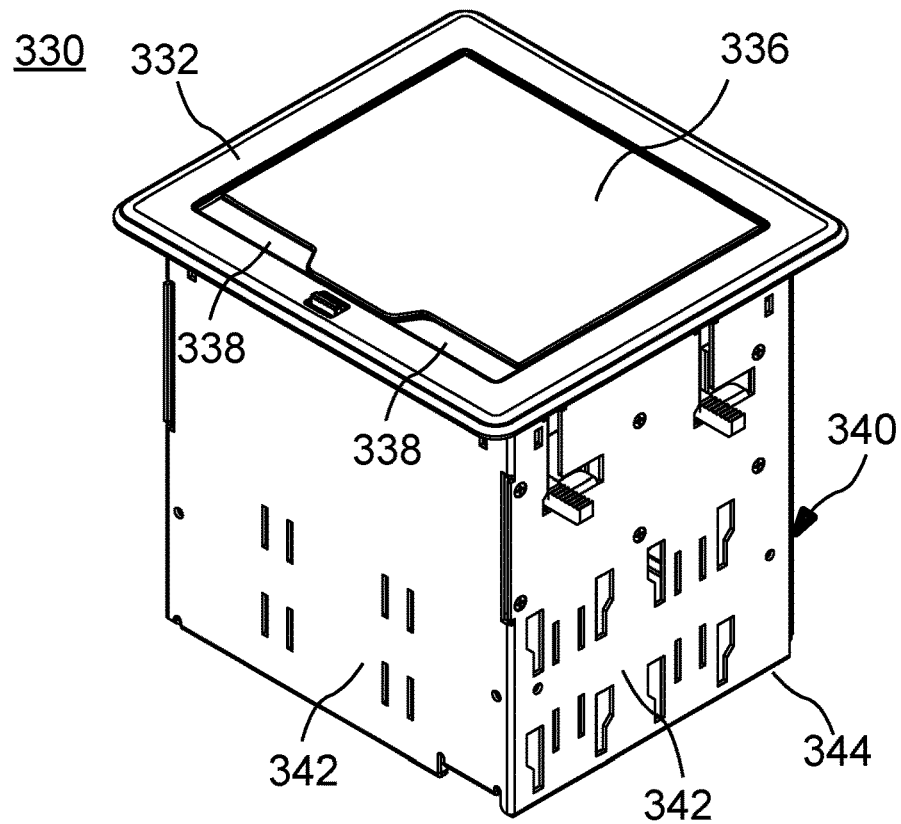

FIG. 3A is an isometric view of a known fliptop unit with various modules inserted therein; and FIG. 3B is an isometric view of another known fliptop unit with the lid closed.

FIGS. 4A and 4B are isometric views of a fliptop module in accordance with an embodiment; and FIGS. 4C-4G are top, bottom, side, front, and rear views, respectively, of the module of FIGS. 4A and 4B.

Figure 5A:
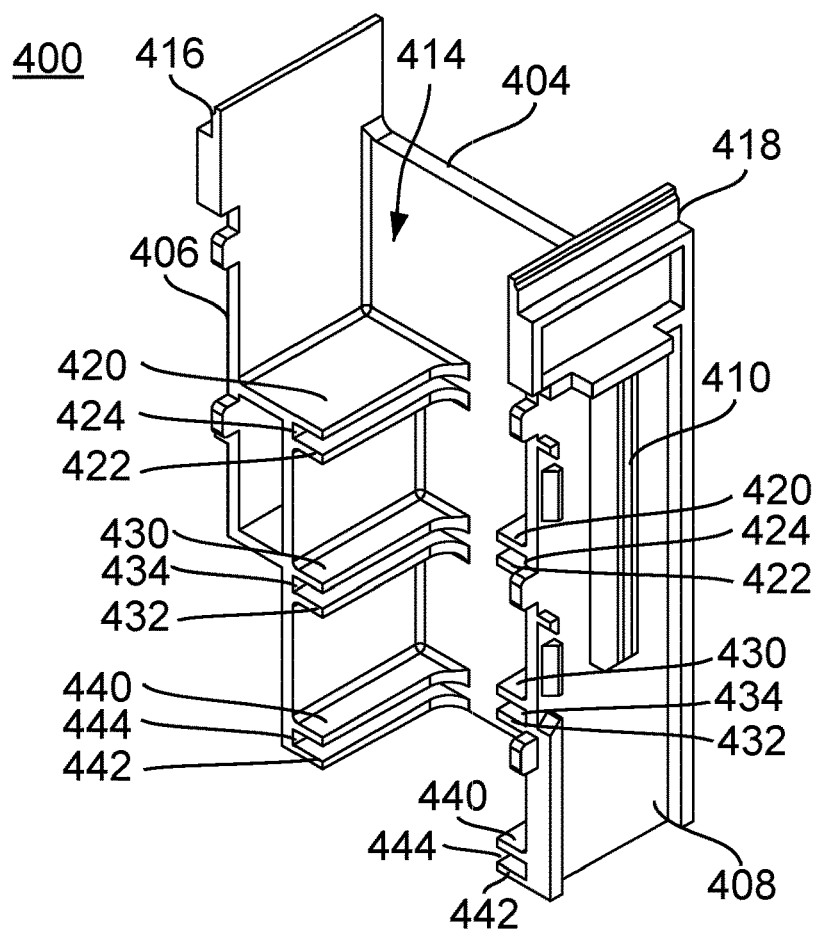
Figure 5B:
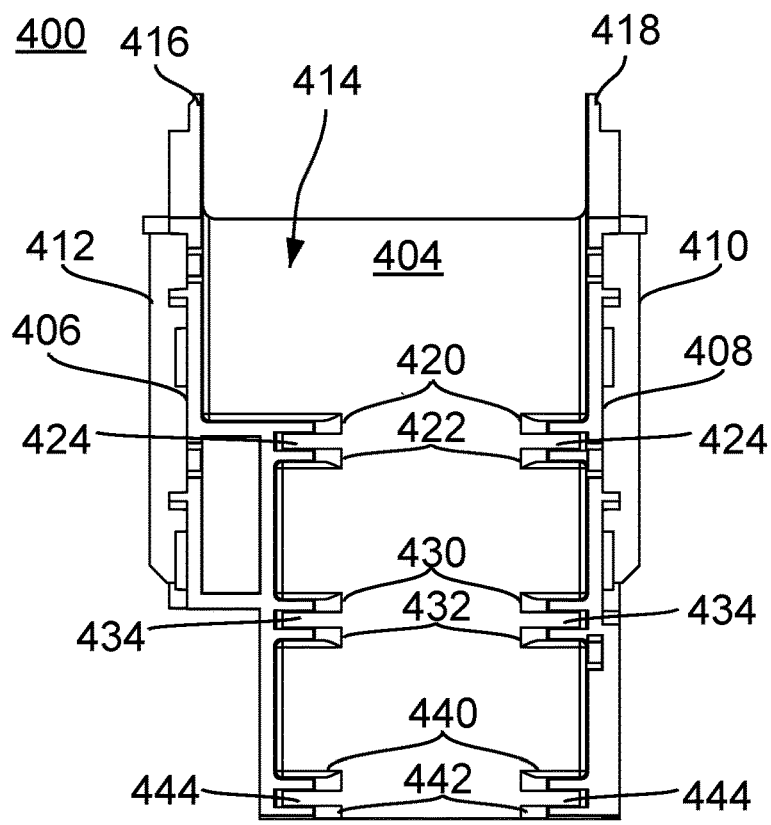

FIGS. 5A and 5B are isometric and side views, respectively, of the module of FIG. 4A with a side cover removed.

Figure 6A:
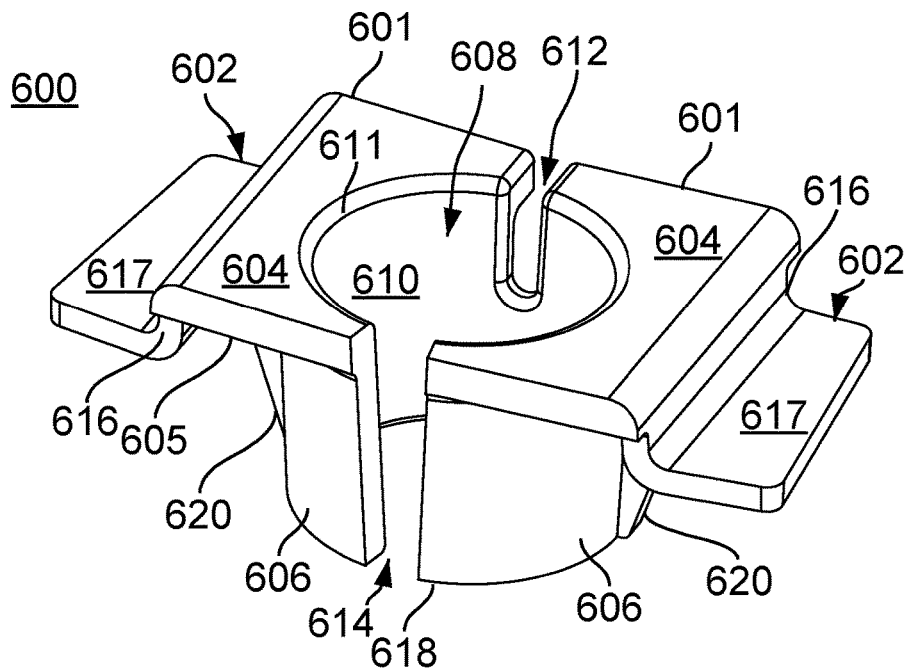

FIG. 6A is an isometric view of a holder insert in accordance with an embodiment; and FIGS. 6B-6E are front, rear, top and bottom views, respectively, of the holder insert of FIG. 6A.

FIG. 7A shows the holder insert of FIGS. 6A-6E arranged upright in the top slot of the module of FIGS. 5A-5B; FIG. 7B shows the holder insert of FIGS. 6A-6E arranged upright in the middle slot of the module of FIGS. 5A-5B; FIG. 7C shows the holder insert of FIGS. 6A-6E arranged upright in the bottom slot of the module of FIGS. 5A-5B; and FIG. 7D shows the holder insert of FIGS. 6A-6E arranged upturned in the top slot of the module of FIGS. 5A-5B.

Figure 8A:
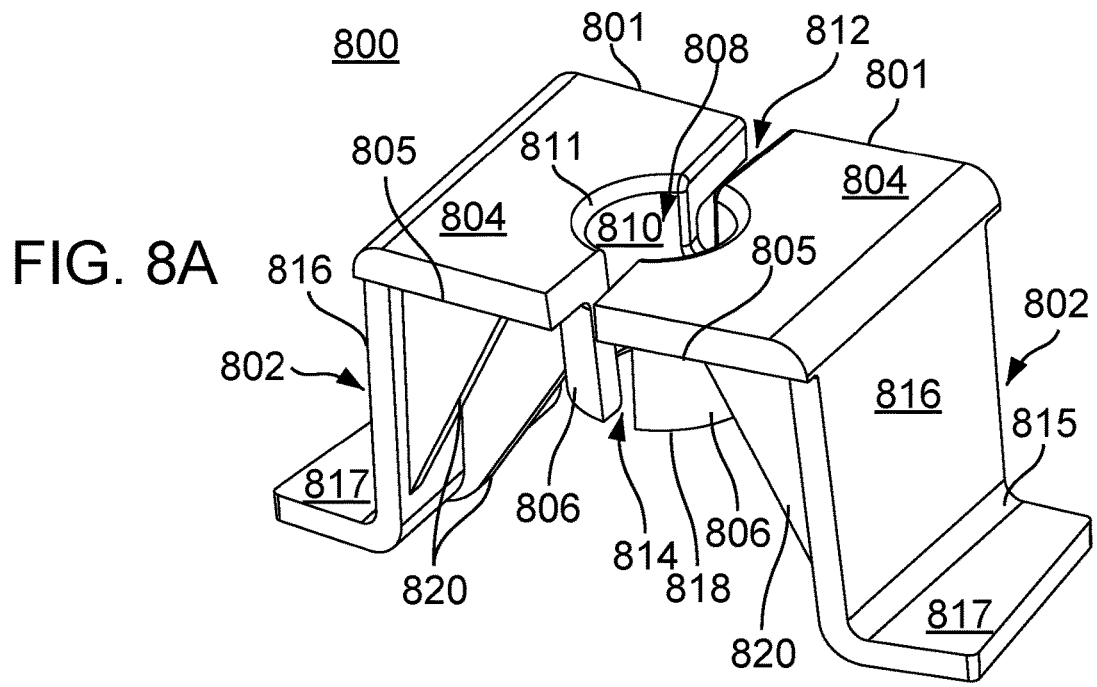

FIG. 8A is an isometric view of a holder insert in accordance with another embodiment; and FIGS. 8B-8E are front, rear, top and bottom views, respectively, of the holder insert of FIG. 8A.

Figure 8B:
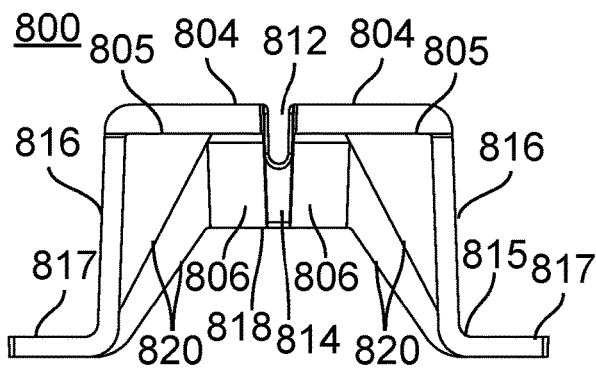
Figure 8C:
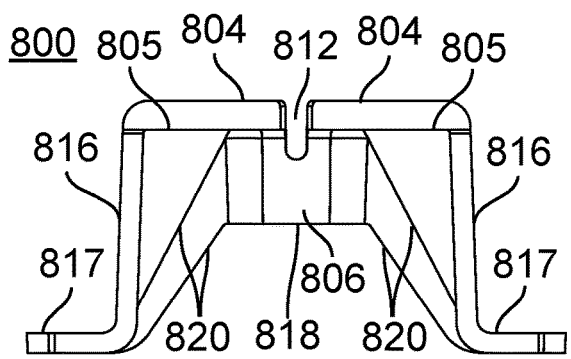
Figure 8D:
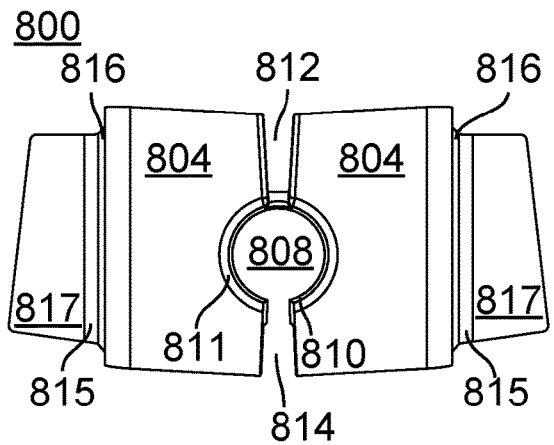
Figure 8E:
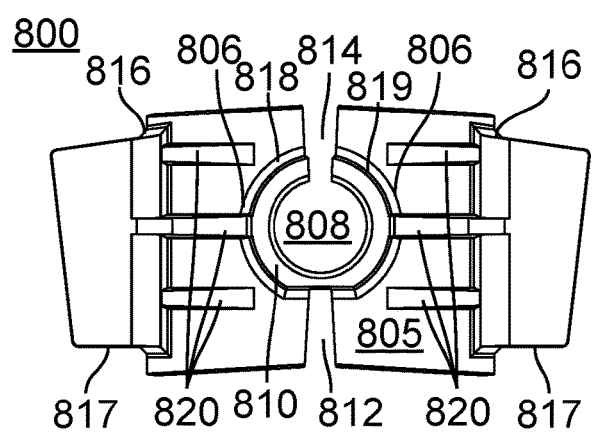
Figure 9A:
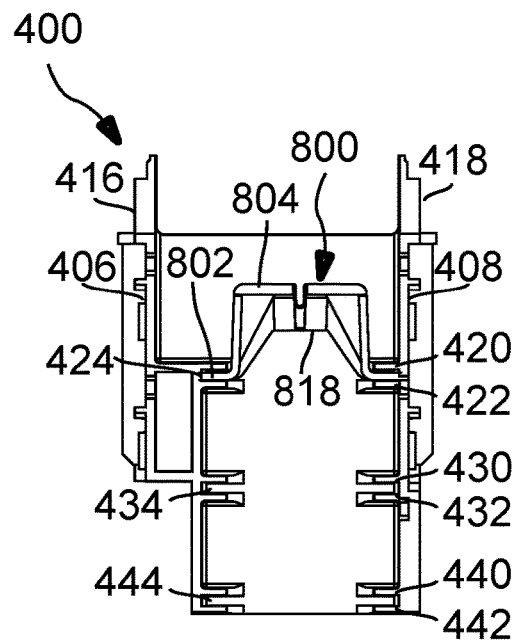
Figure 9B:
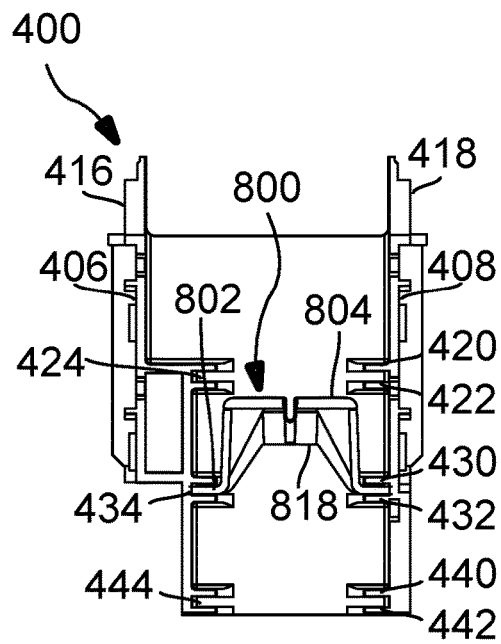
Figure 9C:
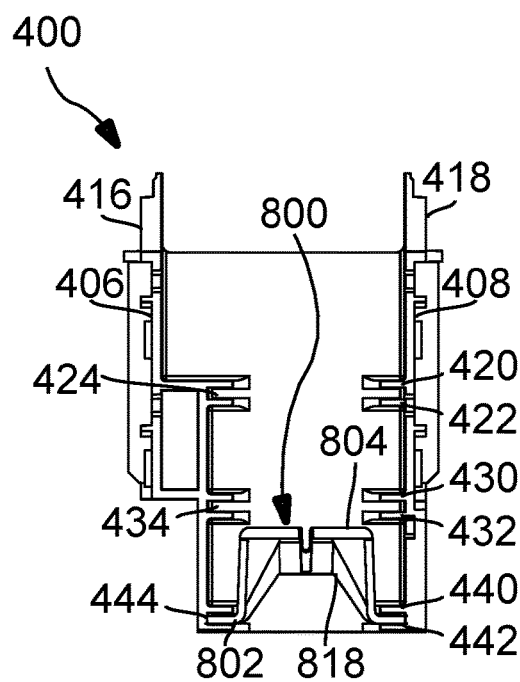
Figure 9D:
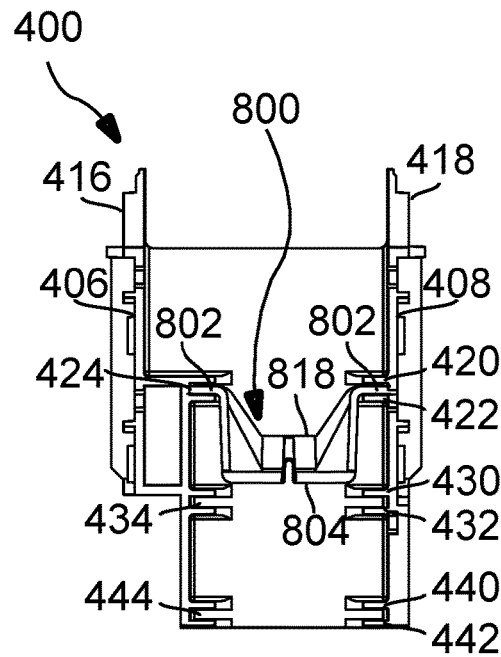

FIG. 9A shows the holder insert of FIGS. 8A-8E arranged upright in the top slot of the module of FIGS. 5A-5B; FIG. 9B shows the holder insert of FIGS. 8A-8E arranged upright in the middle slot of the module of FIGS. 5A-5B; FIG. 9C shows the holder insert of FIGS. 8A-8E arranged upright in the bottom slot of the module of FIGS. 5A-5B; and FIG. 9D shows the holder insert of FIGS. 8A-8E arranged upturned in the top slot of the module of FIGS. 5A-5B.

Figure 10A:
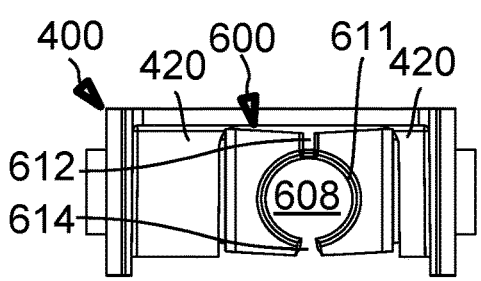
Figure 10C:
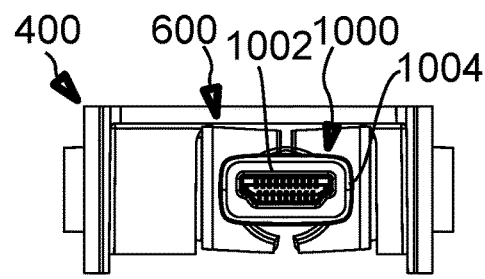
Figure 10B:
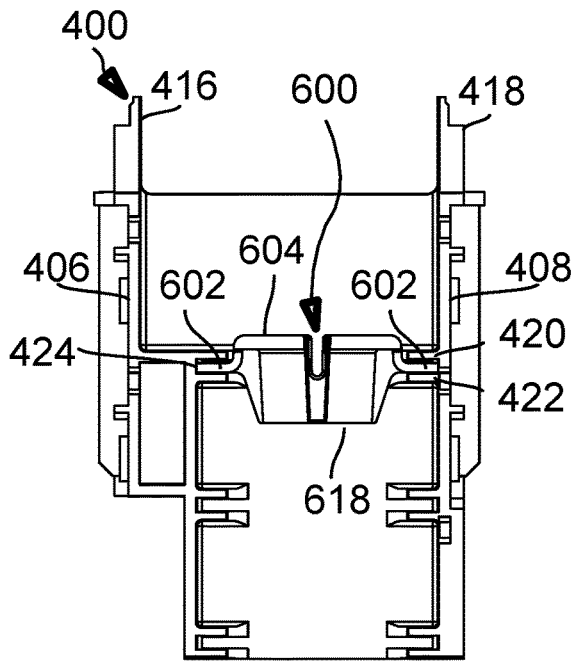
Figure 10D:
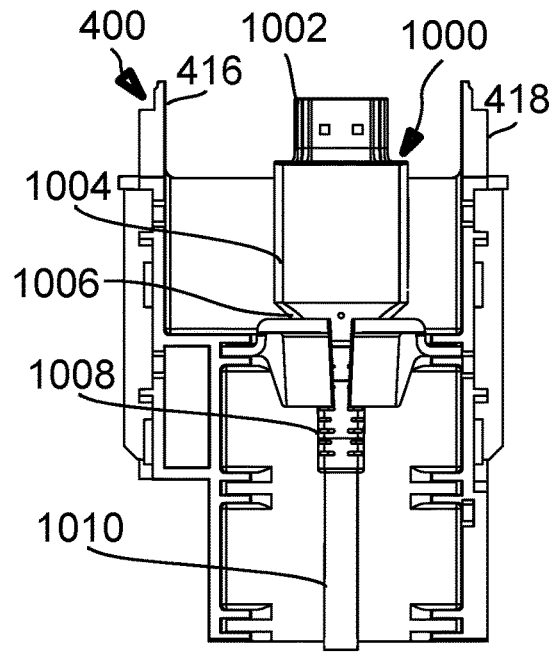
Figure 10E:
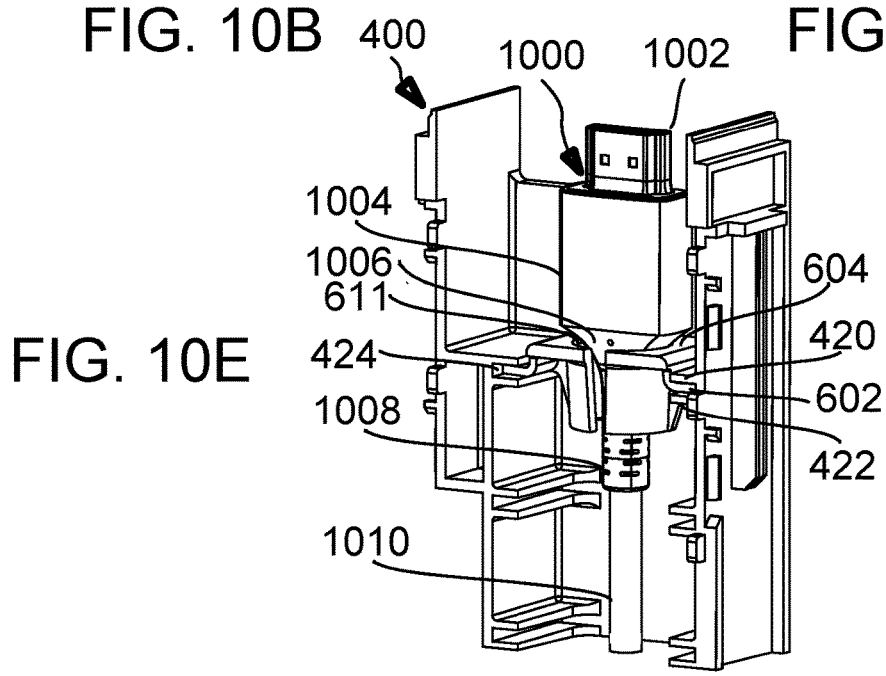

FIGS. 10A-10B are top and side views, respectively, of the holder insert of FIGS. 6A-6E arranged upright in the top slot of the module of FIGS. 5A-5B; and FIGS. 10C-10E are top, side, and isometric views, respectively, of an HDMI® connector and cable disposed in the holder insert and module of FIGS. 10A-10B.

Figure 11A:
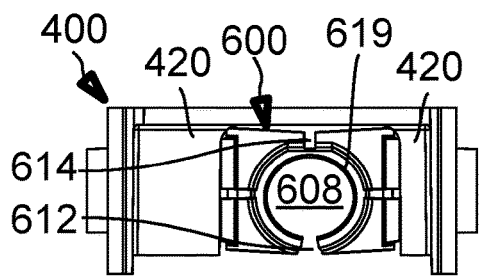
Figure 11C:
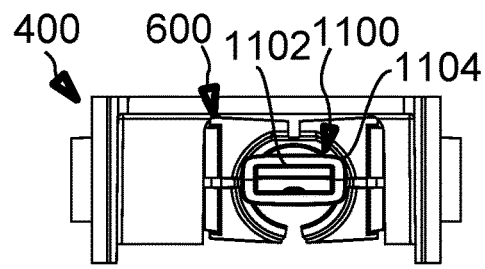
Figure 11B:
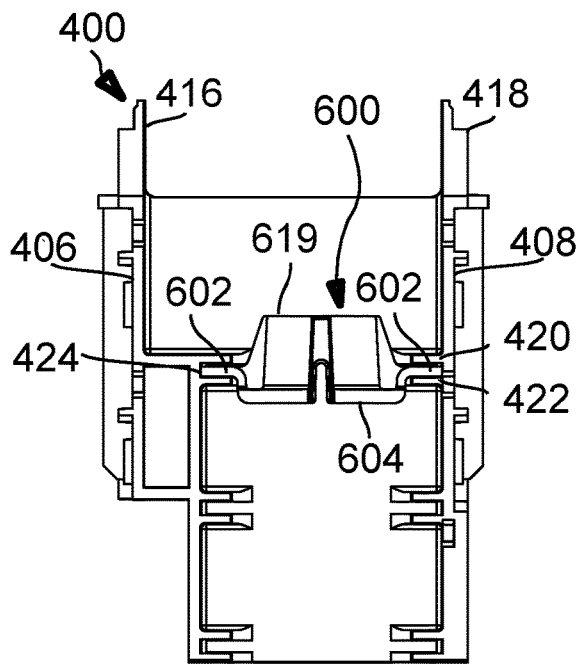
Figure 11D:
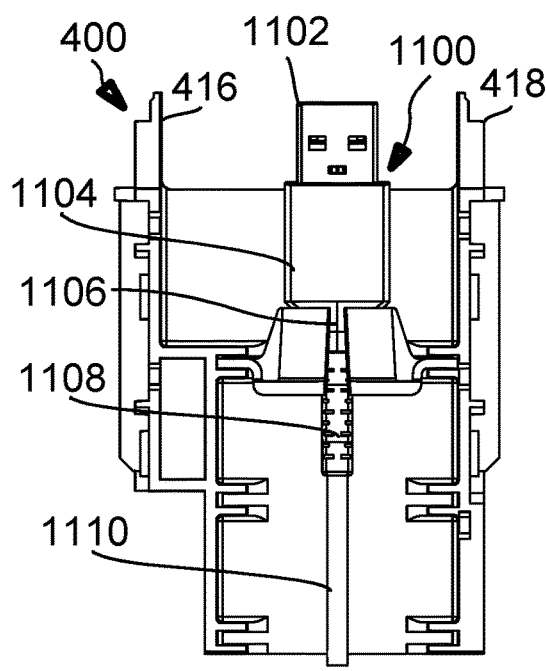
Figure 11E:
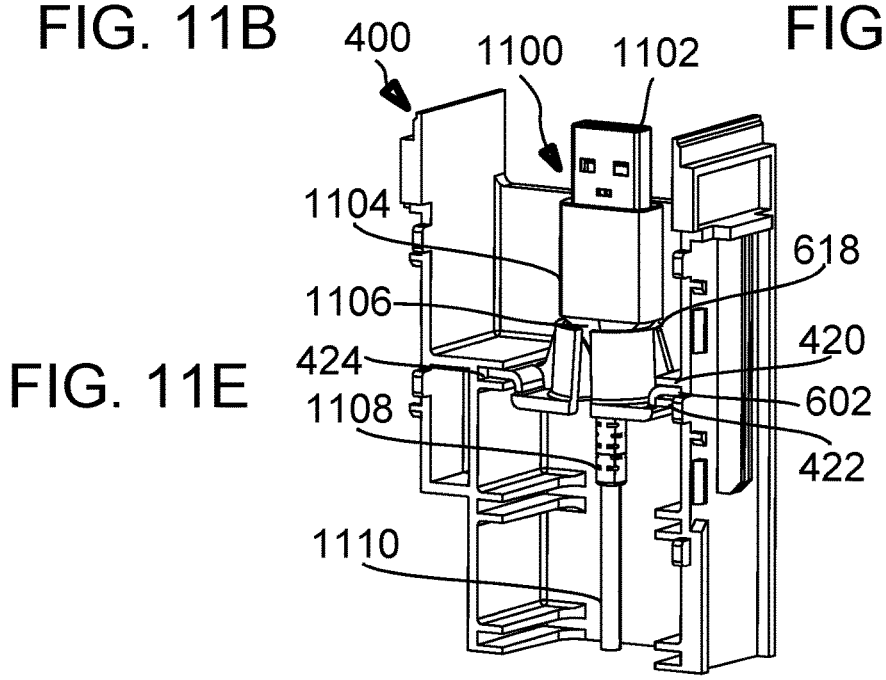

FIGS. 11A-11B are top and side views, respectively, of the holder insert of FIGS. 6A-6E arranged upturned in the top slot of the module of FIGS. 5A-5B; and FIGS. 11C-11E are top, side, and isometric views, respectively, of a USB-A connector and cable disposed in the holder insert and module of FIGS. 11A-11B.

Figure 12A:
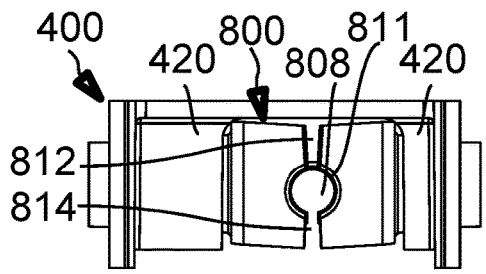
Figure 12C:
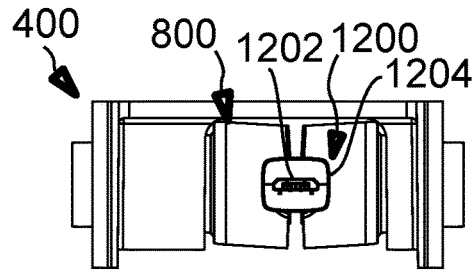
Figure 12B:
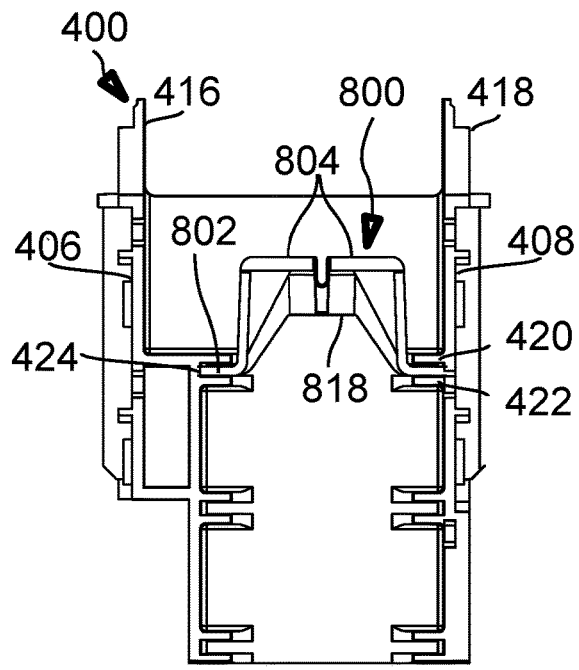
Figure 12D:
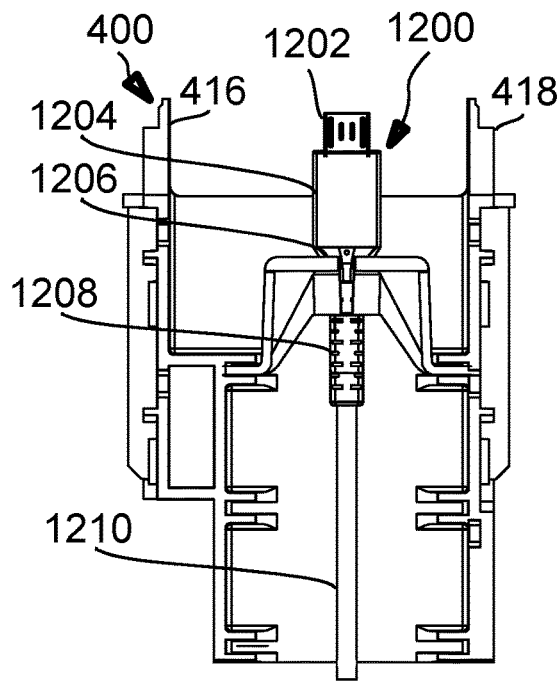
Figure 12E:
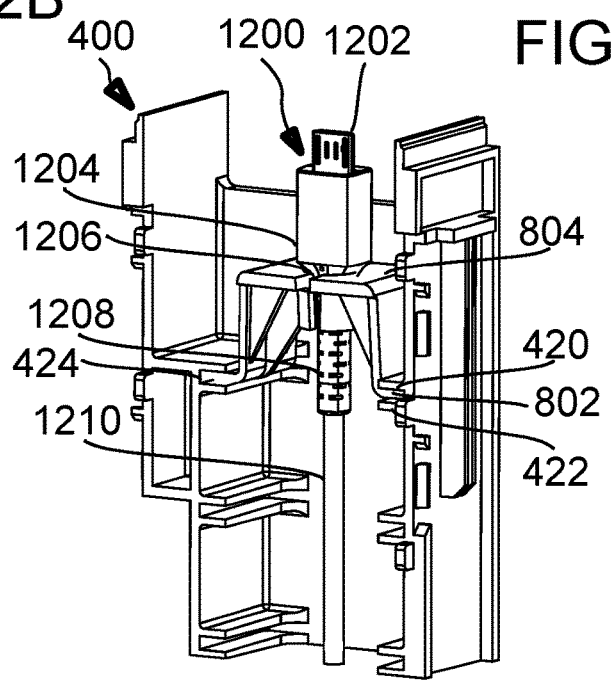

FIGS. 12A-12B are top and side views, respectively, of the holder insert of FIGS. 8A-8E arranged upright in the top slot of the module of FIGS. 5A-5B; and FIGS. 12C-12E are top, side, and isometric views, respectively, of a USB Micro-B connector and cable disposed in the holder insert and module of FIGS. 12A-12B.

FIGS. 13A-13B are top and side views, respectively, of the holder insert of FIGS. 6A-6E arranged upturned in the top slot of the module of FIGS. 5A-5B; and FIGS. 13C-13E are top, side, and isometric views, respectively, of a USB-C® connector and cable disposed in the holder insert and module of FIGS. 13A-13B.

FIGS. 14A-14B are top and side views, respectively, of the holder insert of FIGS. 6A-6E arranged upright in the bottom slot of the module of FIGS. 5A-5B; and FIGS. 14C-14E are top, side, and isometric views, respectively, of a Surefire® connector and cable disposed in the holder insert and module of FIGS. 14A-14B.

Figure 15A:
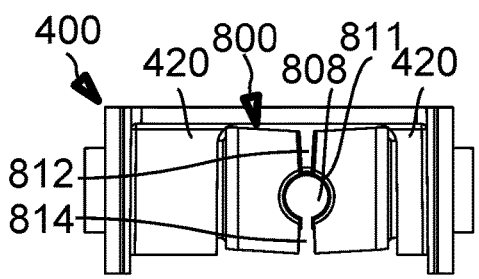
Figure 15C:
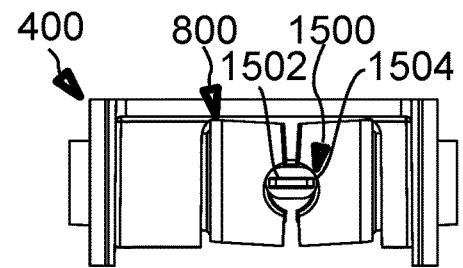
Figure 15B:
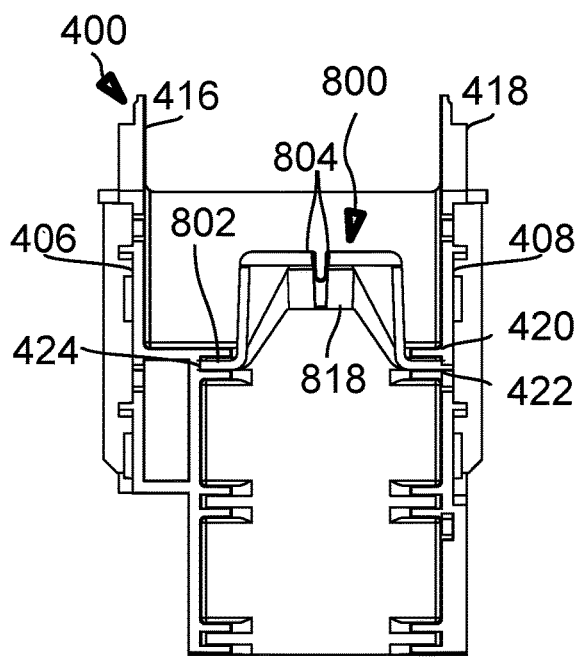
Figure 15D:
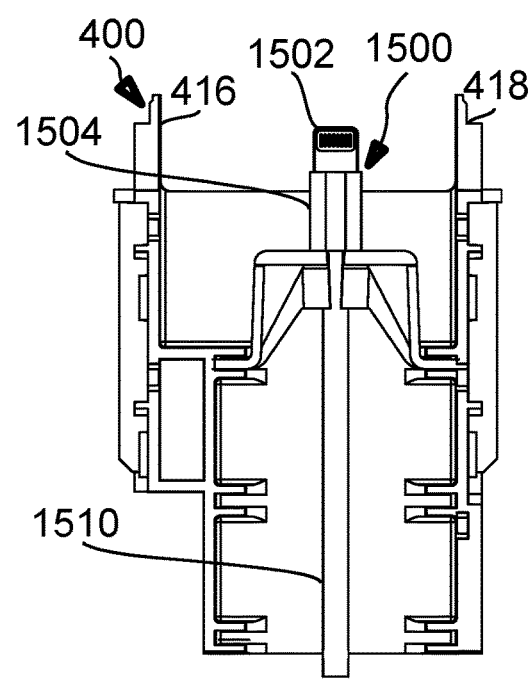
Figure 15E:
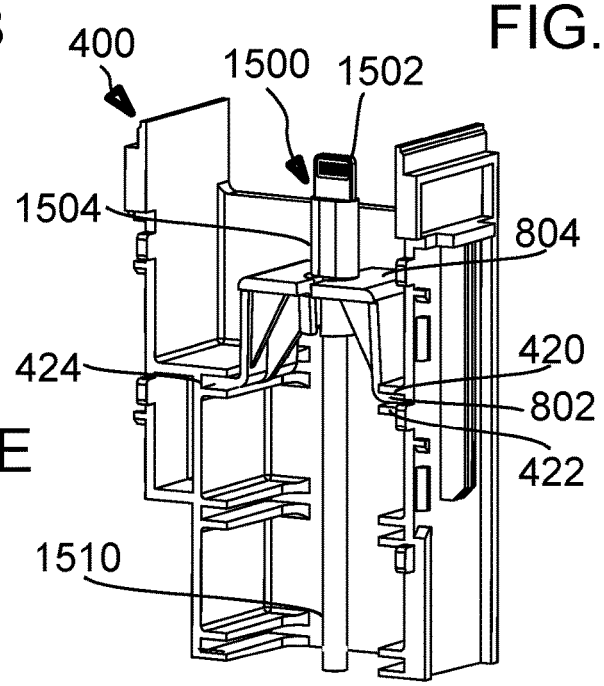

FIGS. 15A-15B are top and side views, respectively, of the holder insert of FIGS. 8A-8E arranged upright in the top slot of the module of FIGS. 5A-5B; and FIGS. 15C-15E are top, side, and isometric views, respectively, of a Lightning® connector and cable disposed in the holder insert and module of FIGS. 15A-15B.

DETAILED DESCRIPTION OF THE INVENTION

The present embodiments provide an improved module for fliptop units in which the module includes a holder insert suitable for receiving and holding a variety of types of data connectors and cables.

Unless the context clearly requires otherwise, throughout the description and the claims, the words "comprise", "comprising", and the like are to be construed in an inclusive sense as opposed to an exclusive or exhaustive sense; that is, in the sense of "including, but not limited to".

LIST OF REFERENCE NUMBERS FOR THE MAJOR ELEMENTS IN THE DRAWING

The following is a list of the major elements in the drawings in numerical order.

100 FlipTop™ Unit
102 Cable Retractor
104 Cable Retractor
200 FlipTop™ Unit
201 FlipTop Opening
202 Bezel
204 Inner Wall
206 Lid
208 Guide Slot
210 Housing
212 Housing Side Walls
214 Bottom
300 FlipTop Unit
302 Bezel
304 Divider
306 Lid
310 Housing
312 Housing Side Walls
314 Bottom
322 1-Gang Pass-Through Module
324 Electrical Receptacle Module
326 Data Receptacle Module
328 2-Gang Pass-Through Module
330 FlipTop Unit
332 Bezel
336 Lid
338 Gaps
340 Housing
342 Housing Side Walls
344 Bottom
400 Module
402 Module Side Wall
404 Module Side Wall
406 Module Rear Wall
408 Module Front Wall
410 Rails
412 Rail
414 Opening
416 Upper Section
418 Upper Section
420 Shelf
422 Shelf
424 Topmost Slot
430 Shelf
432 Shelf
434 Middle Slot
440 Shelf
442 Shelf
444 Lowermost Slot
600 Holder Insert
601 Platform Part
602 Arms
604 First Surface
605 Second Surface
606 Sleeve
608 Aperture
610 Sleeve Inner Wall
611 Rim
612 Gap
614 Gap
616 Curved Section
617 Base Section
618 End Surface
619 Rim
620 Ribs
800 Holder Insert
601 Platform Part
802 Arms
804 First Surface
805 Second surface
806 Sleeve
808 Aperture
810 Sleeve Inner Wall
811 Rim
812 Gap
814 Gap
815 Bend Section 816 Upright Section
817 Base Section
818 End Surface
819 Rim
820 Ribs
1000 HDMI® Connector Head
1002 Connector Plug
1004 Connector Body
1006 Connector Neck
1008 Strain Relief Section
1010 HDMI Cable
1100 USB-A Connector Head
1102 Connector Plug
1104 Connector Body
1108 Strain Relief Section
1110 USB-A Cable
1200 USB Micro-B Connector Head
1202 Connector Plug
1204 Connector Body
1206 Connector Neck
1208 Strain Relief Section
1210 USB Micro-B Cable
1300 USB-C® Connector Head
1302 Connector Plug
1304 Connector Body
1306 Connector Neck
1308 Strain Relief Section
1310 USB-C Cable
1400 Surefire® Connector Head
1402 Connector Plug
1404 Connector Body
1406 Connector Neck
1410 Surefire Cable
1500 Lightning® Connector Head
1502 Connector Plug
1504 Connector Body
1510 Lightning Cable

MODE(S) FOR CARRYING OUT THE INVENTION

The embodiment described herein is in the context of a fliptop module and holder insert, but is not limited thereto, except as may be set forth expressly in the appended claims.

Referring first to FIG. 1, an isometric view of a known FlipTop™ unit 100 is shown with various cable retractors 102, 104 coupled to the fliptop unit. Examples of such cable retractors include the Crestron® One-Touch Cable Retractor disclosed in U.S. Pat. No. 10,549,946, issued Feb. 2, 2020, and U.S. Pat. No. 11,214,462, issued Nov. 27, 2019, both titled "Cable Retractor" and assigned to Crestron Electronics, Inc. Other examples of such cable retractors include those disclosed in U.S. Pat. No. 10,766,736, issued Sep. 8, 2020, and titled "Gravity Driven Cable Retractor", and its continuation-in-part, U.S. Pat. No. 10,772,223, issued Sep. 8, 2020, and titled "Dampened Gravity Retractor", both assigned to Crestron Electronics, Inc. Further examples include the cable retractors disclosed in U.S. Pat. No. 8,469,303 issued Jun. 25, 2013, U.S. Pat. No. 8,469,305 issued Jun. 25, 2013, and U.S. Pat. No. 9,475,673 issued Oct. 25, 2016, each of which is titled "Cable Cord Retractor" and assigned to Crestron Electronics, Inc. The disclosures of each of the above patent are incorporated herein by reference.

FIGS. 2A-2B and 3A-3B are isometric views of known fliptop units 200, 300, 330. The fliptop units 200, 300, 330 are each configured to be inserted into a cutout opening in a conference table, lectern, or other tabletop work surface and to be disposed below the work surface. Examples of such fliptop units are disclosed in U.S. Design Pat. No. D860,996 issued Sep. 12, 2019, and titled "Flip Top Unit", and U.S. Pat. No. 11,355,907 issued Jun. 7, 2022, and titled "Flip Top Integrated Latch", both of which are assigned to Crestron Electronics, Inc., and the disclosures of which are incorporated herein by reference.

The known fliptop unit 200, 300, 330 includes a housing 210, 310, 340 having typically four side walls 212, 312, 342 and a bottom wall 214, 314, 344. One or more of the cable retractors 102, 104 may be coupled to the side walls 212, 312, 342 in the manner shown in FIG. 1. A bezel 202, 302, 332 is attached to the housing 210, 310, 340 and is configured to rest flush atop the tabletop when the fliptop unit 200, 300, 330 is inserted into the cutout opening. As FIGS. 2A-2B and 3A show, a movable door or lid 206, 306 is shown in its open position with only a visible portion of the lid 206, 306 extending above the bezel 202, 302 and a remaining portion of the lid hidden inside the housing 210, 310. When in the closed position, the lid 206, 306 covers the opening 201, 301. FIG. 3B shows an alternative lid 336 in the closed position which has one or more gaps 338 through which cables drawn from within the housing 340 may extend for use while the lid is closed.

Referring to FIGS. 2A and 2B, the fliptop unit 200 is shown without any modules inserted therein. An opening 201 in the housing 210 is configured to receive one or more of the modules, the number of modules depending on the size of the housing, the size of each module, and the number of rows in the opening. Two more inner walls 204 are provided that each include a plurality of guide slots 208. The guide slots 208 are configured to correspond to corresponding guides in the modules and allow for correct insertion of the modules.

Referring to FIG. 3A, the fliptop unit 300 is shown with a plurality of known modules inserted in the opening. Examples of such known modules include a 1-gang pass-through module 322, an electrical receptacle module 324, a data receptacle module 326, and 2-gang pass-through modules 328.

The known 1-gang and 2-gang pass-through modules 322, 328 are each configured to hold a withdrawable/retractable data connector head (not shown) that is attached to a cable. The connector head is ordinarily entirely stored within the module with the bottom of the connector head resting on the bottom of the module. The cable typically extends from the bottom of the connector head through an opening in the bottom of the module to a cable retractor, such as the cable retractors 102, 104 shown in FIG. 1. When needed, the connector head and at least part of the cable may be manually or mechanically withdrawn from the module and from the cable retractor, and when no longer needed, manually or mechanically returned to the module and the cable retractor.

Such known 1-gang and 2-gang pass-through modules 322, 328 typically require a different module design for each type of data connector. Specifically, the height and width of the connector head may differ for each type of data connector, and the width and shape of the cable used may also differ for different types of data connectors. Therefore, the distance from the top of the module to the bottom of the module correspondingly differs for each type of data connector, and the size and shape of the opening in the bottom of the module also differs depending on the cable used. As a result, the module used for a given type of data connector cannot be used for another type of data connector, thereby requiring a different module design and tooling for each type of data connector used and incurring additional costs.

The present embodiments address these problems by providing a module that is suitable for use with various types of data connectors using a holder insert that is similarly suitable for various types of data connectors.

FIGS. 4A-4G show a module 400 in accordance with an embodiment. Specifically, FIGS. 4A and 4B are isometric views of the module 400, FIGS. 4C and 4D are top and bottom views, respectively, of the module 400, FIG. 4E is a side view of the module 400, and FIGS. 4F and 4G are front and rear views, respectively.

The module 400 includes side walls 402, 404, a rear wall 406, and a front wall 408 which together define an opening 414. A rail 412 extends outward along an outer surface of the rear wall 406 and is configured to fit into a corresponding guide slot 208 in the inner wall 204 of the fliptop unit 200 when the module 400 is inserted into the fliptop unit. A pair of rails 410 extend outward along an outer surface of the front wall 408 and are configured to receive a corresponding guide rail (not shown) formed in an opposing inner wall (not shown) of the fliptop unit 200 when the module is inserted into the fliptop unit. The rear wall 406 also includes an upper section 416, and the front wall 408 includes an upper section 418.

FIGS. 5A and 5B show the module 400 with the side cover 402 removed. Specifically, FIG. 5A is an isometric view of the module 400, and FIG. 5B is a side view of the module 400.

FIGS. 5A and 5B show a plurality of paired shelves extending from an inner surface of the rear wall 406 of the module 400 and show another plurality of paired shelves extending from an inner surface of front wall 408. The pairs of shelves are arranged at different heights within the opening 414, with each pair of shelves on the inner surface of one wall having a corresponding pair of shelves at the same height on the inner surface of its opposing wall. Each pair of shelves also defines an associated slot or spacing disposed between the two shelves.

Specifically, the module 400 includes upper pairs of shelves 420, 422, middle pairs of shelves 430, 432, and lower pairs of shelves 440, 442. Each of the pairs of shelves 420,422, 430,432, and 440,442 extend from the inner surface of the rear wall 406 as well as from the inner surface of the front wall 408. Each upper pair of shelves 420, 422 defines topmost slots 424 disposed between each shelf 420 and its adjacent shelf 422. Each middle pair of shelves 430, 432 defines middle slots 434 disposed between each shelf 430 and its adjacent shelf 432. Further, each lower pair of shelves 440, 442 defines bottom slots 444 disposed between each shelf 440 and its adjacent shelf 442. The slots 424, 434, 444 provide a plurality of different heights within the module 400 at which a holder insert may be mounted within the module.

Though FIGS. 5A and 5B show the module 400 having three pairs of slots at three respective heights, other numbers of slots and heights are also within the scope of the embodiment.

Figure 6B:
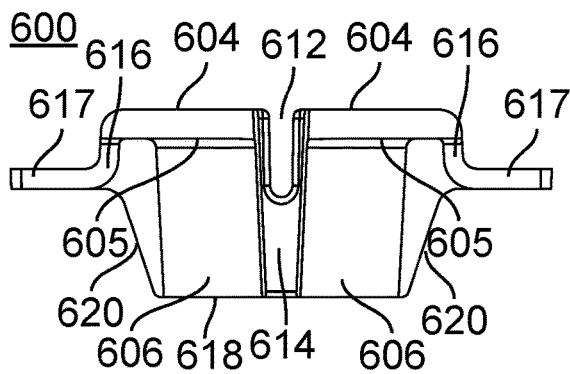
Figure 6C:
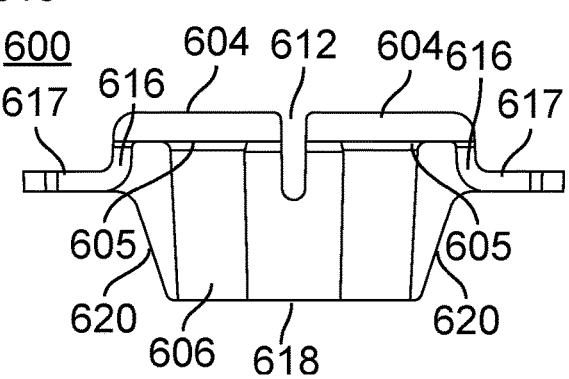
Figure 6D:
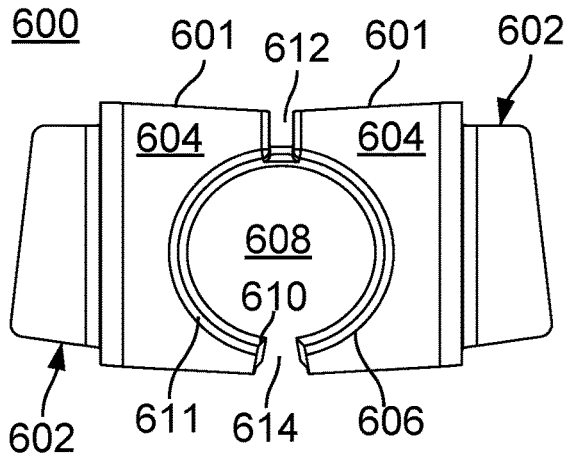
Figure 6E:
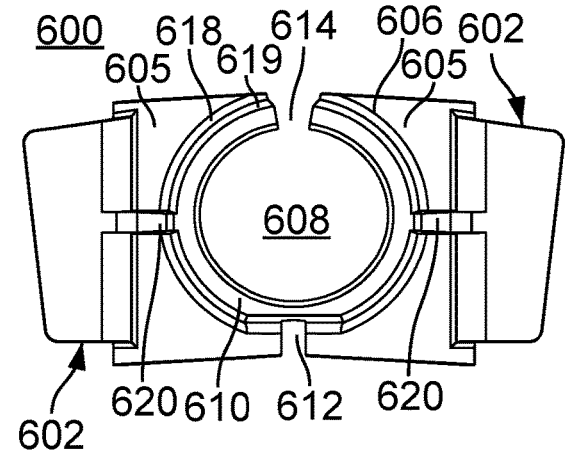

FIGS. 6A-6E show a holder insert 600 in accordance with an embodiment. Specifically, FIG. 6A is an isometric view of the holder insert 600 in an upright orientation, FIGS. 6B and 6C are side views of the holder insert 600 in the upright orientation, FIG. 6D is a top view of the holder insert 600, and FIG. 6E is a bottom view of the holder insert 600.

The holder insert 600 is formed of a single piece of an elastic material, such as a flexible plastic material, and includes a platform part 601 having a first surface 604 and an opposing second surface 605. At each end of the first surface 604, a pair of arms 602 extend from the platform part 601. Each of the arms 602 includes a curved section 616 that, at one end, extends from the second surface 605 of the platform part 601 and then bends outward. Each of the arms 602 further includes a base section 617 that extends further outward from another end of the curved section 616.

A circular sleeve 606 extends from the second surface 605 and terminates at an end surface 618. In an embodiment, the distance from the second surface 605 to the end surface 618, namely, the depth of the sleeve 606, is greater than the distance from the second surface 605 to the base section 617 of each arm 602, that is, the height of the curved section 616. Thus, when the holder insert 600 is in the upright orientation, the end surface 618 of the sleeve 606 is situated below the base section 617 of each of the arms 602, and when the holder insert 600 is in the upturned orientation, the end surface 618 of the sleeve 606 is situated above the base section 617 of each of the arms 602.

An aperture 608 is formed in the holder insert 600 and extends from the first surface 604 of the platform part 601 to the end surface 618 of the sleeve 606. An inner wall 610 of the sleeve 606 substantially surrounds the portion of the aperture 608 that is between the second surface 605 and the end surface 618.

The aperture 608 is configured to receive a lower part of a data connector head when the holder insert 600 is mounted in a fliptop module and the connector head is resting inside the module on the holder insert 600. The aperture 608 also serves as a pass-through for a cable attached to an end of the connector head when the connector head and cable are withdrawn from the module or retracted back into the module.

A slanted rim 611 is located at the intersection of the first surface 604 and the aperture 608. The rim 611 serves to support the tapered neck of the data connector head when the holder insert 600 is mounted in the fliptop module in the upright orientation and the connector head is resting inside the module on the holder insert 600. A region of the neck of the connector head, corresponding to the geometry of the rim 611, rests on the rim 611. At the same time, another part of the neck is situated below the rim 611 in the orifice 608, and a remaining part of the neck is disposed above the rim 611.

Another slanted rim 619 is located at the intersection the aperture 608 and the end surface 618. The rim 619 serves to support the neck of the data connector head when the holder insert 600 is mounted in the fliptop module in the upturned orientation and the connector head is resting inside the module on the upturned holder insert 600. A region of the neck of the connector head, corresponding to the geometry of the rim 619, rests on the rim 619. At the same time, another part of the neck is situated below the rim 619 in the orifice 608, and a remaining part of the neck is disposed above the rim 619.

A gap 612 is formed in the holder insert 600. The gap 612 extends through the platform part 601 from an edge of the platform part 601 to the aperture 608. The gap 612 also extends from the first surface 604 of the platform part 601 down to the second surface 605 of the platform part and then along the depth of the sleeve 606 and terminates part way down the sleeve 606.

Another gap 614 is also formed in the holder insert 600. The gap 614 also extends through the platform part 601 from an edge of the platform part 601 to the aperture 608 and extends from the first surface 604 of the platform part 601 down to the second surface 605 of the platform part. The gap 614, however, extends along the entire depth of the sleeve 606 from the second surface 605 of the platform part to the end surface 618 of the sleeve 606.

The gaps 612 and 614, in combination with the holder insert 600 being a single piece of flexible plastic material, enable the orifice 608 of the holder insert 600 to expand or contract in circumference when a load is applied to the holder insert 600 or removed from the holder insert 600. For example, when the holder insert 600 is mounted in a fliptop module and a connector head is resting on the holder insert 600, the weight and shape of the connector head, together with the weight of the cable attached thereto, may cause the neck of the connector head to press against the rim 611 or 619 of the orifice 608. This pressing on the rim 611 or 619 of the orifice 608 changes the size of one or both of the gaps 612 and 614, thereby increasing the circumference of the orifice 608.

Alternatively, the withdrawal of the connector head from atop the holder insert 600 removes its weight from atop the rim 611 or 619 of the orifice 608, thereby changes the size of one or both of the gaps 612 and 614 which reduces the circumference of the orifice 608.

A plurality of ribs 620 are provided to strengthen the holder insert 600. The ribs 620 extend from the sleeve 606 to the curved sections 616 of the arms and serve to stiffen the holder insert 600 in a "vertical" direction, namely, along the depth of the sleeve 606 and along a length of the curved section 616.

FIGS. 7A-7D are side views of the module 400 with the side cover 402 removed and showing the holder insert 600 mounted therein.

More particularly, FIG. 7A shows the holder insert 600 mounted in the upright orientation at the topmost position in the module 400. That is, the holder insert 600 is arranged in an upright orientation and is inserted into the topmost slot 424 between the shelf 422 and the shelf 420.

FIG. 7B shows the holder insert 600 mounted upright at the middle position in the module 400. Namely, the holder insert 600 is arranged in the upright orientation and is inserted into the middle slot 434 between the shelf 432 and the shelf 430.

FIG. 7C shows the holder insert 600 mounted upright at the bottom position in the module 400. That is, the holder insert 600 is arranged in the upright orientation and is inserted into the bottom slot 444 between the shelf 442 and the shelf 440.

FIG. 7D shows the holder insert 600 mounted in the upturned orientation at the topmost position in the module 400. That is, the holder insert 600 is arranged in an upturned orientation and inserted into the topmost slot 424 between the shelf 422 and the shelf 420. Though the holder insert 600 is only shown inserted into the topmost slot 424 when in the upturned orientation, the holder insert 600 may also be inserted into the middle slot 434 or the bottom slot 444 when in the upturned orientation.

FIGS. 8A-8E show a holder insert 800 in accordance with another embodiment. Specifically, FIG. 8A is an isometric view of the holder insert 800 in an upright orientation, FIGS. 8B and 8C are side views of the holder insert 800 in the upright orientation, FIG. 8D is a top view of the holder insert 800, and FIG. 8E is a bottom view of the holder insert 800.

The holder insert 800 is formed of a single piece of an elastic material, such as a flexible plastic material, and includes a platform part 801 having a first surface 804 and an opposing second surface 805. At opposite ends of the first surface 804, a pair or arms 802 extend from the platform part 801. Each of the arms 802 includes an upright section 816 that, at one end, extends from the second surface 805 of the platform part 801, a curved section 815 that extends from another end of the upright section 816 and then curves outward, and a base section 817 that extends further outward from an end of the curved section 815.

A circular sleeve 806 extends from the second surface 805 and terminates at an end surface 818. Typically, the distance from the second surface 805 to the end surface 818, namely, the depth of the sleeve 806, is less than the distance from the second surface 805 to the base section 817 of each arm 802, namely, the height of the upright section 816. Thus, when the holder insert 800 is in the upright orientation, the base section 817 of each arm 802 is situated below the end surface 818 of the sleeve 806, which differs from the holder insert 600 in which, in the upright orientation, the base section 617 is situated above the end surface 618.

An aperture 808 is formed in the holder insert 800 and extends from the first surface 804 of the platform part 801 to the end surface 818 of the sleeve 806. Typically, the aperture 808 of the holder insert 800 has a smaller diameter and circumference than that of the aperture 608 of the holder insert 600. An inner wall 810 of the sleeve 806 substantially surrounds the portion of the aperture 808 that is between the second surface 805 and the end surface 818.

The aperture 808 is configured to receive a lower part of a data connector head when the holder insert 800 is mounted in a fliptop module and the connector head is resting inside the module on the holder insert 800. The aperture 808 also serves as a pass-through for a cable attached to an end of the connector head when the connector head and cable are withdrawn from the module or retracted back into the module.

A slanted rim 811 is located at the intersection of the first surface 804 and the aperture 808. The rim 811 serves to support the tapered neck of a data connector head when the holder insert 800 is mounted in the fliptop module in the upright orientation and the connector head is resting inside the module on the holder insert 800. A region of the neck of the connector head, corresponding to the geometry of the rim 811, rests on the rim 811. At the same time, another part of the neck is situated below the rim 811 in the orifice 808, and a remaining part of the neck is disposed above the rim 811.

Another slanted rim 819 is located at the intersection the aperture 808 and the end surface 818. The rim 819 serves to support the neck of the data connector head when the holder insert 800 is mounted in the fliptop module in the upturned orientation and the connector head is resting inside the module on the upturned holder insert 800. A region of the neck of the connector head, corresponding to the geometry of the rim 819, rests on the rim 819. At the same time, another part of the neck is situated below the rim 819 in the orifice 808, and a remaining part of the neck is disposed above the rim 819.

A gap 812 is formed in the holder insert 800. The gap 812 extends through the platform part 801 from an edge of the platform part 801 to the aperture 808. The gap 812 also extends from the first surface 804 of the platform part 801 down to the second surface 805 of the platform part and then along the depth of the sleeve 806 and terminates part way down the sleeve 806.

Another gap 814 is also formed in the holder insert 800. The gap 814 also extends through the platform part 801 from an edge of the platform part 801 to the aperture 808 and extends from the first surface 804 of the platform part 801 down to the second surface 805 of the platform part. The gap 814, however, extends along the entire depth of the sleeve 806 from the second surface 805 of the platform part to the end surface 818 of the sleeve 806.

A plurality of ribs 820 are provided to strengthen the holder insert 800. The ribs 820 extend from the second surface 805 to the upright section 816 of the arms and serve to stiffen the holder insert 800 in a "vertical" direction, namely, along the depth of the sleeve 806 and along a length of the upright section 816.

The gaps 812 and 814, in combination with the holder insert 800 being a single piece of flexible plastic material, enable the holder insert 800 to expand or contract in circumference when a load is applied to the holder insert 800 or removed from the holder insert 800. For example, when the holder insert 800 is mounted in a fliptop module and a connector head is resting on the holder insert 800, the weight of the connector head, together with the cable attached thereto, may cause the neck of the connector head to press against the rim 811 or 819 of the orifice 808. This pressing on the rim 811 or 819 of the orifice 808 changes the size of one or both of the gaps 812 and 814, thereby increasing the circumference of the orifice 808.

Alternatively, the withdrawal of the connector head from atop the holder insert 800 removes its weight from atop the rim 811 or 819 of the orifice 808, thereby changes the size of one or both of the gaps 812 and 814 which reduces the circumference of the orifice 808.

FIGS. 9A-9D are side views of the module 400 with the side cover 402 removed and showing the holder insert 800 mounted therein.

More particularly, FIG. 9A shows the holder insert 800 mounted in the upright orientation at the topmost position in the module 400. That is, the holder insert 800 is arranged in an upright orientation and is inserted into the topmost slot 424 between the shelf 422 and the shelf 420.

FIG. 9B shows the holder insert 800 mounted upright at the middle position in the module 400. Namely, the holder insert 800 is arranged in the upright orientation and is inserted into the middle slot 434 between the shelf 432 and the shelf 430.

FIG. 9C shows the holder insert 800 mounted upright at the bottom position in the module 400. That is, the holder insert 800 is arranged in the upright orientation and is inserted into the bottom slot 444 between the shelf 442 and the shelf 440.

FIG. 9D shows the holder insert 800 mounted upturned at the topmost position in the module 400. That is, the holder insert 800 is arranged in an upturned orientation and inserted into the topmost slot 424 between the shelf 422 and the shelf 420. Though the holder insert 800 is only shown inserted into the topmost slot 424 when in the upturned orientation, the holder insert 800 may also be inserted into the middle slot 434 or the bottom slot 444 when in the upturned orientation.

Though only two embodiments 600, 800 of a holder insert are disclosed, other configurations of holder inserts that are suitable for receiving various types of connector heads and cables, and that are mountable within the module 400 or other fliptop modules, are also within the scope of the disclosure.

FIGS. 10A-10E, 11A-11E, 12A-12E, 13A-13E, 14A-14E, and 15A-15E show examples in which the module 400 and the holder insert 600, 800 of the embodiments are used to house various types of data connectors heads and cables.

The width of the connector head and, particularly, the width of the tapered neck of the connector head at the location where the tapered neck would rest on the rim of the holder insert, determine whether the holder insert 600 or the holder insert 800 is to be chosen for holding that connector head. Generally, the holder insert 600 is used with wider connector heads and with wider cables because of the wider aperture 608 and rims 611, 619 of the holder insert 600. Conversely, the holder insert 800 is used with smaller connector heads and with smaller cables because of the narrower aperture 808 and rims 811, 819 of the holder insert 800.

Also, the height of the connector head while resting in the holder insert affects whether the topmost slot 424, the middle slot 434 or the bottom slot 444 is chosen for mounting the holder insert 600 or 800 as well as whether the upright orientation or the upturned orientation is chosen. Specifically, in order for the lid of the fliptop unit to close while the connector head rests in the holder insert 600 or 800, the connector head (and more specifically the connector plug situated at the top of the connector head) cannot protrude above the top of the walls of the fliptop module as the protruding connector head would prevent the lid of the fliptop unit from closing. At the same time, it is also desirable to have the body of the connector head reside as close as possible to the top of the opening of the module so that the connector body may be more easily grasped by a user and withdrawn from the module with the cable.

FIGS. 10A-10B are top and side views, respectively, of the module 400 and the holder insert 600 as configured to receive and hold an HDMI® connector head 1000 with an HDMI cable 1010 extending from the bottom of the HDMI connector 1000. Here, the holder insert 600 is arranged in the upright orientation and is positioned in the topmost slot 424 in the manner described in connection with FIG. 7A.

The HDMI connector head 1000, as FIGS. 10C-10E show, includes a connector plug 1002, a connector body or housing 1004 having a tapered neck 1006 at one end, and a strain relief section 1008. The connector plug 1002 extends out of another end of the connector body 1004 and includes a shield that surrounds a plurality of connector pins. The HDMI cable 1010 extends from the tapered neck 1006 of the connector body 1004. The strain relief section 1008 is located where an end of the cable 1010 meets the tapered neck 1006 to protect the cable 1010.

FIGS. 10C-10E also show the HDMI connector head 1000 while resting on the holder insert 600 and being located inside the module 400 with the HDMI cable 1010 fully retracted. FIG. 10C is a top view thereof, FIG. 10D is a side view, and FIG. 10E is an isometric view.

A middle section of the tapered neck 1006 of the HDMI connector head 1000 rests on the rim 611 at the intersection of the first surface 604 of the platform part 601 and the aperture 608. An upper part of the tapered neck 1006, together with the remainder of the connector body 1004 and the connector plug 1002, reside above the holder insert 600. A lower part of the tapered neck 1006, together with part of the strain relief section 1008, reside in the aperture 608 of the holder insert 600. The remainder of the strain relief section 1008 and the cable 1010 continue below the aperture 608.

As FIGS. 10C and 10D show, the weight of the HDMI connector head 1000, as well as the width of the tapered neck 1006 of the HDMI connector body 1002, create a stress on the holder insert 600. Because of the presence of the gaps 612, 614 and because of the holder insert 600 being formed of a single piece of a flexible plastic material, the holder insert 600 deforms to accommodate the load. Specifically, the spacings of the gaps 612, 614 increase, which allow the diameter of the aperture 608 to increase, as shown when the same features in FIGS. 10A and 10B are compared to FIGS. 10C and 10D, respectively.

The holder insert 600 is chosen to accommodate the HDMI connector head 1000, rather than the holder insert 800, because the aperture 608 of the holder insert 600 has a larger diameter than the aperture 808 of the holder insert 800. As FIGS. 10D and 10E show, the larger diameter aperture 608 is better suited for receiving a connector head and cable that are the size of the HDMI connector head 1000 and the HDMI cable 1010.

Also, as FIG. 10B shows, the topmost slot 424 of the of the module 400 is chosen to receive the holder insert 600, and the upright orientation is selected. The reason for these selections is, as FIGS. 10D and 10E show, to have the top of the connector plug 1002 rest below the tops of the upper section 418, 416 of the front and rear walls 408, 406 of the module 400 while the HDMI connector head 1000 rests on the holder insert 600. Thus, the lid of the fliptop unit is not prevented from closing by the connector head.

At the same time, the topmost slot 424 of the module 400 and the upright orientation of the holder insert 600 are chosen so that the connector body 1004 of the connector head 1000 resides as close as possible to the top of the opening of the module 400 while the HDMI connector head 1000 rests on the holder insert 600, thereby allowing for easier withdrawal of the connector head 1000.

FIGS. 11A-11B are top and side views, respectively, of the module 400 and the holder insert 600 as configured to receive and hold an USB-A connector head 1100 with a USB-A cable 1110 extending from the bottom of the USB-A connector 1100. Here, the holder insert 600 is arranged in the upturned orientation and is positioned in the topmost slot 424 in the manner described in connection with FIG. 7D.

The USB-A connector head 1100, as FIGS. 11C-11E show, includes a connector plug 1102, a connector body or housing 1104 having a tapered neck 1106 at one end, and a strain relief section 1108. The connector plug 1102 extends out of another end of the connector body 1104 and includes a shield that surrounds a plurality of connector pins. The USB-A cable 1110 extends from the tapered neck 1106 of the connector body 1104. The strain relief section 1108 is located where an end of the cable 1110 meets the tapered neck 1106 to protect the cable 1110.

FIGS. 11C-11E also show the USB-A connector head 1100 while resting on the holder insert 600 and being located inside the module 400 with the USB-A cable 1110 fully retracted. FIG. 11C is a top view thereof, FIG. 11D is a side view, and FIG. 11E is an isometric view.

An upper section of the tapered neck 1106 of the USB-A connector head 1100 rests on the rim 619 at the intersection of the end surface 618 of the sleeve 606 and the aperture 608. The remainder of the connector body 1104 and the connector plug 1102 reside above the holder insert 600. A lower part of the tapered neck 1106, together with part of the strain relief section 1108, reside in the aperture 608 of the holder insert 600. The remainder of the strain relief section 1108 and the cable 1110 continue below the aperture 608.

As FIGS. 11C and 11D show, the weight of the USB-A connector head 1100, as well as the width of the tapered neck 1106 of the USB-A connector body 1102, create a stress on the holder insert 600. Because of the presence of the gap 614 and because of the holder insert 600 being formed of a single piece of a flexible plastic material, the holder insert 600 deforms to accommodate the load. Specifically, the spacing of the gap 614 increases, which allow the diameter of the aperture 608 to increase, as shown when the same features in FIGS. 11A and 11B are compared to FIGS. 11C and 11D, respectively.

The holder insert 600 is chosen to accommodate the USB-A connector head 1100, rather than the holder insert 800, because the aperture 608 of the holder insert 600 has a larger diameter than the aperture 808 of the holder insert 800. As FIGS. 11D and 11E show, the larger diameter aperture 608 is better suited for receiving a connector head and cable that are the size of the USB-A connector head 1100 and the USB-A cable 1110.

Also, as FIG. 11B shows, the topmost slot 424 of the of the module 400 is chosen to receive the holder insert 600, and the upturned orientation is selected. The reason for these selections is, as FIGS. 11D and 11E show, to have the top of the connector plug 1102 rest below the tops of the upper section 418, 416 of the front and rear walls 408, 406 of the module 400 while the USB-A connector head 1100 rests on the holder insert 600. Thus, the lid of the fliptop unit is not prevented from closing by the connector head.

At the same time, the topmost slot 424 of the module 400 and the upturned orientation of the holder insert 600 are chosen so that the connector body 1104 of the connector head 1100 resides as close as possible to the top of the opening of the module 400 while the USB-A connector head 1100 rests on the holder insert 600, thereby allowing for easier withdrawal of the connector head 1100.

FIGS. 12A-12B are top and side views, respectively, of the module 400 and the holder insert 800 as configured to receive and hold a USB MICRO-B connector head 1200 with a USB MICRO-B cable 1210 extending from the bottom of the USB MICRO-B connector 1200. Here, the holder insert 800 is arranged in the upright orientation and is positioned in the topmost slot 424 in the manner described in connection with FIG. 9A.

The USB MICRO-B connector head 1200, as FIGS. 12C-12E show, includes a connector plug 1202, a connector body or housing 1204 having a tapered neck 1206 at one end, and a strain relief section 1208. The connector plug 1202 extends out of another end of the connector body 1204 and includes a shield that surrounds a plurality of connector pins. The USB MICRO-B cable 1210 extends from the tapered neck 1206 of the connector body 1204. The strain relief section 1208 is located where an end of the cable 1210 meets the tapered neck 1206 to protect the cable 1210.

FIGS. 12C-12E also show the USB MICRO-B connector head 1200 while resting on the holder insert 800 and being located inside the module 400 with the USB MICRO-B cable 1210 fully retracted. FIG. 12C is a top view thereof, FIG. 12D is a side view, and FIG. 12E is an isometric view.

A middle section of the tapered neck 1206 of the USB MICRO-B connector head 1200 rests on the rim 811 at the intersection of the first surface 804 of the platform part 801 and the aperture 808. An upper part of the tapered neck 1206, together with the remainder of the connector body 1204 and the connector plug 1202, reside above the holder insert 800. A lower part of the tapered neck 1206, together with part of the strain relief section 1208, reside in the aperture 808 of the holder insert 800. The remainder of the strain relief section 1208 and the cable 1210 continue below the aperture 808.

As FIGS. 12C and 12D show, the weight of the USB MICRO-B connector head 1200, as well as the width of the tapered neck 1206 of the USB MICRO-B connector body 1202, create a stress on the holder insert 800. Because of the presence of the gaps 812, 814 and because of the holder insert 800 being formed of a single piece of a flexible plastic material, the holder insert 800 deforms to accommodate the load. Specifically, the spacings of the gaps 812, 814 increase, which allow the diameter of the aperture 808 to increase, as shown when the same features in FIGS. 12A and 12B are compared to FIGS. 12C and 12D, respectively.

The holder insert 800 is chosen to accommodate the USB MICRO-B connector head 1200, rather than the holder insert 600, because the aperture 808 of the holder insert 800 has a smaller diameter than the aperture 608 of the holder insert 600. As FIGS. 12D and 12E show, the smaller diameter aperture 808 is better suited for receiving a connector head and cable that are the size of the MICRO-B connector head 1200 and the MICRO-B cable 1210.

Also, as FIG. 12B shows, the topmost slot 424 of the of the module 400 is chosen to receive the holder insert 800, and the upright orientation is selected. The reason for these selections is, as FIGS. 12D and 12E show, to have the top of the connector plug 1202 rest below the tops of the upper section 418, 416 of the front and rear walls 408, 406 of the module 400 while the USB MICRO-B connector head 1200 rests on the holder insert 800. Thus, the lid of the fliptop unit is not prevented from closing by the connector head.

At the same time, the topmost slot 424 of the module 400 and the upright orientation of the holder insert 800 are chosen so that the connector body 1204 of the connector head 1200 resides as close as possible to the top of the opening of the module 400 while the USB MICRO-B connector head 1200 rests on the holder insert 800, thereby allowing for easier withdrawal of the connector head 1200.

FIGS. 13A-13B are top and side views, respectively, of the module 400 and the holder insert 600 as configured to receive and hold an USB-C connector head 1300 with a USB-C cable 1310 extending from the bottom of the USB-C connector 1300. Here, the holder insert 600 is arranged in the upturned orientation and is positioned in the topmost slot 424 in the manner described in connection with FIG. 7D.

The USB-C connector head 1300, as FIGS. 13C-13E show, includes a connector plug 1302, a connector body or housing 1304 having a tapered neck 1306 at one end, and a strain relief section 1308. The connector plug 1302 extends out of another end of the connector body 1304 and includes a shield that surrounds a plurality of connector pins. The USB-C cable 1310 extends from the tapered neck 1306 of the connector body 1304. The strain relief section 1308 is located where an end of the cable 1310 meets the tapered neck 1306 to protect the cable 1310.

FIGS. 13C-13E also show the USB-C connector head 1300 while resting on the holder insert 600 and being located inside the module 400 with the USB-C cable 1310 fully retracted. FIG. 13C is a top view thereof, FIG. 13D is a side view, and FIG. 13E is an isometric view.

An upper section of the tapered neck 1306 of the USB-C connector head 1300 rests on the rim 619 at the intersection of the end surface 618 of the sleeve 606 and the aperture 608. The remainder of the connector body 1304 and the connector plug 1302 reside above the holder insert 600. A lower part of the tapered neck 1306, together with part of the strain relief section 1308, reside in the aperture 608 of the holder insert 600. The remainder of the strain relief section 1308 and the cable 1310 continue below the aperture 608.

As FIGS. 13C and 13D show, the weight of the USB-C connector head 1300, as well as the width of the tapered neck 1306 of the USB-C connector body 1302, create a stress on the holder insert 600. Because of the presence of the gap 614 and because of the holder insert 600 being formed of a single piece of a flexible plastic material, the holder insert 600 deforms to accommodate the load. Specifically, the spacing of the gap 614 increases, which allow the diameter of the aperture 608 to increase, as shown when the same features in FIGS. 13A and 13B are compared to FIGS. 13C and 13D, respectively.

The holder insert 600 is chosen to accommodate the USB-C connector head 1300, rather than the holder insert 800, because the aperture 608 of the holder insert 600 has a larger diameter than the aperture 808 of the holder insert 800. As FIGS. 13D and 13E show, the larger diameter aperture 608 is better suited for receiving a connector head and cable that are the size of the USB-C connector head 1300 and the USB-C cable 1310.

Also, as FIG. 13B shows, the topmost slot 424 of the of the module 400 is chosen to receive the holder insert 600, and the upturned orientation is selected. The reason for these selections is, as FIGS. 13D and 13E show, to have the top of the connector plug 1302 rest below the tops of the upper section 418, 416 of the front and rear walls 408, 406 of the module 400 while the USB-C connector head 1300 rests on the holder insert 600. Thus, the lid of the fliptop unit is not prevented from closing by the connector head.

At the same time, the topmost slot 424 of the module 400 and the upturned orientation of the holder insert 600 are chosen so that the connector body 1304 of the connector head 1300 resides as close as possible to the top of the opening of the module 400 while the USB-C connector head 1300 rests on the holder insert 600, thereby allowing for easier withdrawal of the connector head 1300.

FIGS. 14A-14B are top and side views, respectively, of the module 400 and the holder insert 600 as configured to receive and hold a Surefire® connector head 1400 with a flat Surefire cable 1410 extending from the bottom of the Surefire connector 1400. Here, the holder insert 600 is arranged in the upright orientation and is positioned in the bottom slot 444 in the manner described in connection with FIG. 7C.

The Surefire connector head 1400, as FIGS. 14C-14E show, includes a connector plug 1402, a tapered connector body or housing 1404 having a curved neck 1406 at one end. The connector plug 1402 extends out of another end of the connector body 1404 and includes a shield that surrounds a plurality of connector pins. The Surefire cable 1410 extends from the curved neck 1406 of the connector body 1404.

FIGS. 14C-14E also show the Surefire connector head 1400 while resting on the holder insert 600 and being located inside the module 400. FIG. 14C is a top view thereof, FIG. 14D is a side view, and FIG. 14E is an isometric view.

A bottom section of the curved neck 1406 of the Surefire connector head 1400 rests on the rim 611 at the intersection of the first surface 604 of the platform part 601 and the aperture 608. The remainder of the curved neck 1406, together with the connector body 1404 and the connector plug 1402, reside above the holder insert 600. An upper part of the cable 1410 resides in the aperture 608 of the holder insert 600, and the remainder of the cable 1410 continues below the aperture 608.

As FIGS. 14C and 14D show, the weight of the Surefire connector head 1400, the width of the curved neck 1406 of the Surefire connector body 1402, and the width of the flat cable 1410 each create a stress on the holder insert 600. Because of the presence of the gaps 612, 614 and because of the holder insert 600 being formed of a single piece of a flexible plastic material, the holder insert 600 deforms to accommodate the load. Specifically, the spacings of the gaps 612, 614 increase, which allow the diameter of the aperture 608 to increase, as shown when the same features in FIGS. 14A and 14B are compared to FIGS. 14C and 14D, respectively.

The holder insert 600 is chosen to accommodate the Surefire connector head 1400, rather than the holder insert 800, because the aperture 608 of the holder insert 600 has a larger diameter than the aperture 808 of the holder insert 800. As FIGS. 14D and 14E show, the larger diameter aperture 608 is better suited for receiving a connector head and cable that are the size of the Surefire connector head 1400 and the Surefire cable 1410.

Also, as FIG. 14B shows, the bottom slot 444 of the of the module 400 is chosen to receive the holder insert 600, and the upright orientation is selected. The reason for these selections is, as FIGS. 14D and 14E show, to have the top of the connector plug 1402 rest below the tops of the upper section 418, 416 of the front and rear walls 408, 406 of the module 400 while the Surefire connector head 1400 rests on the holder insert 600. Thus, the lid of the fliptop unit is not prevented from closing by the connector head.

FIGS. 15A-15B are top and side views, respectively, of the module 400 and the holder insert 800 as configured to receive and hold a Lightning® connector head 1500 with a Lightning® cable 1510 extending from the bottom of the Lightning connector 1500. Here, the holder insert 800 is arranged in the upright orientation and is positioned in the topmost slot 424 in the manner described in connection with FIG. 9A.

The Lightning connector head 1500, as FIGS. 15C-15E show, includes a connector plug 1502 and a connector body or housing 1504. The connector plug 1502 extends out of one end of the connector body 1504 and includes a plurality of connector pins. The cable 1510 extends from another end of the connector body 1504.

FIGS. 15C-15E also show the Lightning connector head 1500 while resting on the holder insert 800 and being located inside the module 400 with the Lightning cable 1510 fully retracted. FIG. 15C is a top view thereof, FIG. 15D is a side view, and FIG. 15E is an isometric view.

An end section of the connector body 1504 rests on the rim 811 at the intersection of the first surface 804 of the platform part 801 and the aperture 808. The remainder of the connector body 1504, together with the connector plug 1502, reside above the holder insert 800. An upper part of the cable 1510 resides in the aperture 808 of the holder insert 800, and the remainder of the cable 1510 continues below the aperture 808.

As FIGS. 15C and 15D show, the weight of the Lightning connector head 1500, as well as the width of the Lightning connector body 1502, create a stress on the holder insert 800. Because of the presence of the gaps 812, 814 and because of the holder insert 800 being formed of a single piece of a flexible plastic material, the holder insert 800 deforms to accommodate the load. Specifically, the spacings of the gaps 812, 814 increase, which allow the diameter of the aperture 808 to increase, as shown when the same features in FIGS. 15A and 15B are compared to FIGS. 15C and 15D, respectively.

The holder insert 800 is chosen to accommodate the Lightning connector head 1500, rather than the holder insert 600, because the aperture 808 of the holder insert 800 has a smaller diameter than the aperture 608 of the holder insert 600. As FIGS. 15D and 15E show, the smaller diameter aperture 808 is better suited for receiving a connector head and cable that are the size of the Lightning connector head 1500 and the Lightning 1510.

Also, as FIG. 15B shows, the topmost slot 424 of the of the module 400 is chosen to receive the holder insert 800, and the upright orientation is selected. The reason for these selections is, as FIGS. 15D and 15E show, to have the top of the connector plug 1502 rest below the tops of the upper section 418, 416 of the front and rear walls 408, 406 of the module 400 while the Lightning connector head 1500 rests on the holder insert 800. Thus, the lid of the fliptop unit is not prevented from closing by the connector head.

At the same time, the topmost slot 424 of the module 400 and the upright orientation of the holder insert 800 are chosen so that the connector body 1504 of the connector head 1500 resides as close as possible to the top of the opening of the module 400 while the Lightning connector head 1500 rests on the holder insert 800, thereby allowing for easier withdrawal of the connector head 1500.

Thus, the present embodiments provide a fliptop module in which a holder insert may be mounted at a plurality of heights within the module. The present embodiments further provide flexible, elastic holder inserts that may be mounted at such heights within the module, at either an upright or inverted orientation, which are suitable for receiving and holding a variety of types of data connectors and cables without interfering with the closure of the fliptop unit.

Though only one such fliptop module 400 is depicted in the figures, other arrangements of fliptop modules that are suitable for receiving and holding a variety of types of data connectors and cables are also within the scope of the embodiments. Further, though only holder inserts 600 and 800 are presented in the figures, other arrangements of holder inserts that are suitable for receiving and holding a variety of types of data connectors and cables are likewise within the scope of the embodiments.

INDUSTRIAL APPLICABILITY

To solve the aforementioned problems, the present embodiments provide a fliptop module and holder inserts suitable for receiving and holding a variety of types of data connectors and cables.

It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described as being in particular combinations, each feature or element may be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus, the embodiments are capable of many variations in detailed implementation that may be derived from the description contained herein by a person skilled in the art. No element, act, or instruction used in the description of the present application should be construed as critical or essential to the embodiments unless explicitly described as such. Also, as used herein, the article "a" is intended to include one or more items.

In addition, the above disclosed methods are not meant to limit the aspects of the embodiments, or to suggest that the aspects of the embodiments should be implemented following the aforementioned methods. The purpose of the aforementioned methods is to facilitate the understanding of one or more aspects of the embodiments and to provide the reader with one or many possible implementations of the processed discussed herein. It should be understood by one of ordinary skill in the art that the steps of the aforementioned methods may be performed in a different order and that some steps may be eliminated or substituted.

All United States patents and applications, foreign patents, and publications discussed above are hereby incorporated herein by reference in their entireties.

ALTERNATE EMBODIMENTS

Alternate embodiments may be devised without departing from the spirit or the scope of the embodiments.

What is claimed is:

1. A holder insert that is insertable within a module of a fliptop unit for supporting any one of a variety of connectors that may be stored in the module, the holder insert comprising:
    (a) a platform part having a first surface, an opposing second surface, and an aperture formed therein having a depth that extends at least through the platform part;
    (b) a pair of arms that are located at opposite ends of the platform part, each one of the pair of arms extending away from the platform part and having an end section that is configured to be mountable at a particular height within the module; and
    (c) a sleeve that extends from the second surface of the platform part to an end surface thereof and that substantially surrounds the aperture in the platform part and thereby extends the depth of the aperture to the end surface of the sleeve;
    (d) wherein
        (1) at least one gap is formed in the holder insert, the at least one gap extending in one direction from an edge of the platform part to the aperture in the platform part, and extending in another direction from the first surface of the platform part to the second surface of the platform part and then through a wall of the sleeve along a depth of the sleeve at least part way to the end surface of the sleeve, and
        (2) the holder insert is formed of a single piece of elastic material such that upon a load being placed on the holder insert, the holder insert deforms and a width of the at least one gap changes.

2. The holder insert of claim 1, wherein each one of the pair of arms includes
    (a) a bend section that extends from the second surface of the platform part and bends into a direction away from the sleeve; and
    (b) a further section that extends outward from an end of the bend section and that terminates at the end section.

3. The holder insert of claim 1, wherein each one of the pair of arms includes
    (a) an upright section that extends from the second surface of the platform part and has a length greater than the depth of the sleeve;
    (b) a bend section that extends from an end of the upright section and bends into a direction away from the sleeve; and
    (b) a further section that extends from an end of the bend section and that terminates at the end section.

4. The holder insert of claim 1, wherein the at least one gap includes
    (a) a first gap that extends in the one direction from the edge of the platform part to the aperture in the platform part, and that extends in the another direction from the first surface of the platform part to the second surface of the platform part and then through the wall of the sleeve along an entire depth of the sleeve to the end surface of the sleeve.

5. The holder insert of claim 4, wherein the at least one gap includes
    (a) a second gap that extends in a direction opposite to the one direction from the edge of the platform part to the aperture in the platform part, and that extends in the another direction from the first surface of the platform part to the second surface of the platform part and then through the wall of the sleeve along a part of the depth of the sleeve and terminates part way along the sleeve.

6. The holder insert of claim 1, wherein
    (a) an inner wall of the sleeve is cylindrically shaped.

7. The holder insert of claim 1, wherein
    (a) the holder insert is configured to be mountable within the module in an upright orientation.

8. The holder insert of claim 7, wherein
    (a) upon the holder insert being mounted within the module in the upright orientation,
        (1) the holder insert is arranged to receive a connector head such that a portion of the connector head rests at least upon an intersection of the first surface and the aperture, and
        (2) a cable extending from an end of the connector head passes through the aperture and exits at the end surface.

9. The holder insert of claim 8, wherein
    (a) the holder insert is further configured to be alternatively mountable within the module in an upturned orientation.

10. The holder insert of claim 9, wherein
    (a) upon the holder insert being mounted within the module in the upturned orientation,
        (1) the holder insert is arranged to receive a connector head such that a portion of the connector head rests at least upon an intersection of the end surface and the aperture, and
        (2) a cable extending from an end of the connector head passes through the aperture and exits at the first surface.

11. The holder insert of claim 1, wherein
    (a) the load being placed on the holder insert is a connector head that increases the width of the at least one gap, thereby increasing a circumference of the aperture.

12. The holder insert of claim 1, wherein
    (a) the load being placed on the holder insert is a connector head, and
    (b) the connector head is at least one of an HDMI® connector head, a USB-A connector head, a USB-C® connector head, a USB Micro-B connector head, a Surefire® connector head, or a Lightning® connector head.

13. A holder insert that is insertable within a module of a fliptop unit for supporting any one of a variety of connectors that may be stored in the module, the holder insert comprising:
(a) a platform part having a first surface, an opposing second surface, and an aperture formed therein having a depth that extends at least through the platform part;
(b) a pair of arms that are located at opposite ends of the platform part, each one of the pair of arms extending away from the platform part and having an end section that is configured to be mountable at a particular height within the module, each one of the pair of arms including
(1) a bend section that extends from the second surface of the platform part and bends into a direction away from the sleeve, and
(2) a further section that extends outward from an end of the bend section and that terminates at the end section; and
(c) a sleeve that extends from the second surface of the platform part to an end surface thereof and that substantially surrounds the aperture in the platform part and thereby extends the depth of the aperture to the end surface of the sleeve;
(d) wherein
(1) a first gap is formed in the holder insert, the first gap extending in one direction from the edge of the platform part to the aperture in the platform part, and then extending in another direction from the first surface of the platform part to the second surface of the platform part and then through a wall of the sleeve along an entire depth of the sleeve to the end surface of the sleeve,
(2) a second gap is formed in the holder insert, the second gap extending in a direction opposite to the one direction from the edge of the platform part to the aperture in the platform part, and extending in the another direction from the first surface of the platform part to the second surface of the platform part and then through the wall of the sleeve along a part of the depth of the sleeve, terminating part way to the end surface of the sleeve,
(3) the holder insert is configured to be mountable within the module in an upright orientation and is further configured to be alternatively mountable within the module in an upturned orientation, such that
(A) upon the holder insert being mounted within the module in the upright orientation, the holder insert is arranged to receive a connector head such that a portion of the connector head rests at least upon an intersection of the first surface and the aperture, and
(B) upon the holder insert being mounted within the module in the upturned orientation, the holder insert is arranged to receive the connector head such that a portion of the connector head rests at least upon an intersection of the end surface and the aperture, and
(4) the holder insert is formed of a single piece of elastic material such that upon the connector head being received on the holder insert, the holder insert deforms and a width of the first and second gap increase, thereby increasing a circumference of the aperture.
14. The holder insert of claim 13, wherein
(a) an inner wall of the sleeve is cylindrically shaped.

15. The holder insert of claim 13, wherein
(a) the connector head is at least one of an HDMI® connector head, a USB-A connector head, a USB-C® connector head, a USB Micro-B connector head, a Surefire® connector head, or a Lightning® connector head.
16. A holder insert that is insertable within a module of a fliptop unit for supporting any one of a variety of connectors that may be stored in the module, the holder insert comprising:
(a) a platform part having a first surface, an opposing second surface, and an aperture formed therein having a depth that extends at least through the platform part;
(b) a pair of arms that are located at opposite ends of the platform part, each one of the pair of arms extending away from the platform part and having an end section that is configured to be mountable at a particular height within the module, each one of the pair of arms including
(1) an upright section that extends from the second surface of the platform part and has a length greater than the depth of the sleeve;
(2) a bend section that extends from an end of the upright section and bends into a direction away from the sleeve; and
(3) a further section that extends from an end of the bend section and that terminates at the end section; and
(c) a sleeve that extends from the second surface of the platform part to an end surface thereof and that substantially surrounds the aperture in the platform part and thereby extends the depth of the aperture to the end surface of the sleeve;
(d) wherein
(1) a first gap is formed in the holder insert, the first gap extending in one direction from the edge of the platform part to the aperture in the platform part, and then extending in another direction from the first surface of the platform part to the second surface of the platform part and then through a wall of the sleeve along an entire depth of the sleeve to the end surface of the sleeve,
(2) a second gap is formed in the holder insert, the second gap extending in a direction opposite to the one direction from the edge of the platform part to the aperture in the platform part, and extending in the another direction from the first surface of the platform part to the second surface of the platform part and then through the wall of the sleeve along a part of the depth of the sleeve, terminating part way to the end surface of the sleeve,
(3) the holder insert is configured to be mountable within the module in an upright orientation, such that
(A) upon the holder insert being mounted within the module in the upright orientation, the holder insert is arranged to receive a connector head such that a portion of the connector head rests at least upon an intersection of the first surface and the aperture, and
(4) the holder insert is formed of a single piece of elastic material such that upon the connector head being received on the holder insert, the holder insert deforms and a width of the first and second gap increase, thereby increasing a circumference of the aperture.
17. The holder insert of claim 16, wherein
(a) an inner wall of the sleeve is cylindrically shaped.

18. The holder insert of claim 16, wherein
(a) the connector head is at least one of an HDMI® connector head, a USB-A connector head, a USB-C® connector head, a USB Micro-B connector head, a Surefire® connector head, or a Lightning® connector head.

\* \* \* \* \*